United States Patent
Burrows et al.

(10) Patent No.: US 7,634,517 B1
(45) Date of Patent: Dec. 15, 2009

(54) SYSTEM AND METHOD FOR DYNAMICALLY UPDATING A DOCUMENT REPOSITORY WITHOUT INTERRUPTING CONCURRENT QUERYING

(75) Inventors: Michael Burrows, Palo Alto, CA (US); Jeffrey A. Dean, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 11/352,024

(22) Filed: Feb. 10, 2006

(51) Int. Cl.
G06F 17/30 (2006.01)

(52) U.S. Cl. .......................... 707/203; 707/3; 707/100; 707/101; 707/102; 707/206

(58) Field of Classification Search .......... 707/200–206
See application file for complete search history.

(56) References Cited

U.S. PATENT DOCUMENTS

| | | | | |
|---|---|---|---|---|
| 6,128,627 A * | 10/2000 | Mattis et al. | ................. | 707/202 |
| 6,401,239 B1 * | 6/2002 | Miron | ......................... | 707/203 |
| 6,484,185 B1 * | 11/2002 | Jain et al. | .................... | 707/203 |
| 6,507,847 B1 * | 1/2003 | Fleischman | ................. | 707/101 |
| 6,658,451 B1 * | 12/2003 | Chaudhry et al. | ........... | 718/108 |
| 6,868,425 B1 * | 3/2005 | Bergstraesser et al. | .. | 707/103 R |
| 6,968,348 B1 * | 11/2005 | Carone et al. | .............. | 707/203 |
| 6,970,893 B2 * | 11/2005 | Dahlstedt | .................... | 707/206 |
| 6,973,465 B2 * | 12/2005 | Kuzmin | ...................... | 707/203 |
| 7,003,534 B2 * | 2/2006 | Peng | .......................... | 707/203 |
| 7,089,270 B2 * | 8/2006 | Ren et al. | ................... | 707/203 |
| 7,111,001 B2 * | 9/2006 | Harris et al. | ................... | 707/5 |
| 7,206,795 B2 * | 4/2007 | Bono | ......................... | 707/203 |
| 7,210,010 B2 * | 4/2007 | Ogle | .......................... | 711/162 |
| 7,225,208 B2 * | 5/2007 | Midgley et al. | ............. | 707/204 |
| 7,225,211 B1 * | 5/2007 | Colgrove et al. | ............ | 707/205 |
| 7,293,005 B2 * | 11/2007 | Fontoura et al. | ............... | 707/1 |
| 7,320,009 B1 * | 1/2008 | Srivastava et al. | ........ | 707/104.1 |
| 7,353,242 B2 * | 4/2008 | Kodama | ..................... | 707/204 |
| 2003/0065899 A1 * | 4/2003 | Gorobets | ..................... | 711/165 |
| 2004/0205090 A1 * | 10/2004 | Shimbo et al. | ............. | 707/200 |
| 2004/0220979 A1 * | 11/2004 | Young et al. | ................ | 707/203 |
| 2005/0065986 A1 * | 3/2005 | Bixby et al. | ................ | 707/204 |
| 2005/0210461 A1 * | 9/2005 | Srivastava et al. | .......... | 717/170 |
| 2006/0136511 A1 * | 6/2006 | Ngo et al. | .................... | 707/203 |
| 2007/0043686 A1 * | 2/2007 | Teng et al. | ..................... | 707/1 |

* cited by examiner

*Primary Examiner*—Tim T. Vo
*Assistant Examiner*—Michelle Owyang
(74) *Attorney, Agent, or Firm*—Morgan, Lewis & Bockius LLP

(57) ABSTRACT

A tokenspace repository stores documents as a sequence of tokens. A first version of a document is stored in the repository, within an accessible range of the repository. When a second version of the document is received, the second version is also stored in the repository and the accessible range of the repository is modified to include both the first version and the second version of the document. Then the first version of the document is invalidated. Queries are executed against the repository in a plurality of threads without interruption during the operations of receiving the second version of the document, storing the second version of the document in the repository, modifying the accessible range of the repository, and invalidating the first version of the document.

12 Claims, 18 Drawing Sheets

| Doc1 | Doc2 | ••• | DocN |

Accessible Range

Figure 14A

| Doc1 | Doc2 | ••• | DocN | DocN+1 (copy of Doc1) |

Accessible Range

Figure 14B

| Invalid_Doc1 | Doc2 | ••• | DocN | DocN+1 |

Accessible Range

Figure 14C

| Invalid_Doc1 | Doc2 | ••• | DocN | DocN+1 |

Accessible Range

Figure 14D

| Doc2 | ••• | DocN | DocN+1 |

Accessible Range

Figure 14E

SYSTEM AND METHOD FOR DYNAMICALLY UPDATING A DOCUMENT REPOSITORY WITHOUT INTERRUPTING CONCURRENT QUERYING

TECHNICAL FIELD

The disclosed embodiments relate generally to data processing systems and methods, and in particular to a document repository that supports low latencies from when a document is updated to when the document is available to queries, and that requires little synchronization between query threads and repository update threads.

RELATED APPLICATIONS

This application is related to U.S. patent application Ser. No. 11/352,023, "Low Overhead Thread Synchronization System and Method for Garbage Collecting Stale Data in a Document Repository Without Interrupting Concurrent Querying," filed Feb. 10, 2006.

This application is related to U.S. patent application Ser. No. 11,352,025, "Document Treadmilling System and Method for Updating Documents in a Document Repository and Recovering Storage Space From Invalidated Documents," filed Feb. 10, 2006.

BACKGROUND

Information retrieval systems, such as search engines, run queries against an index of documents generated from a document corpus (e.g., the World Wide Web). A typical inverted index includes the words in each document, together with pointers to their locations within the documents. A document processing system prepares the inverted index by processing the contents of the documents, pages or sites retrieved from the document corpus using an automated or manual process. The document processing system may also store the contents of the documents, or portions of the content, in a repository for use by a query processor when responding to a query.

In some information retrieval systems, freshness of the results (i.e., the turnaround from when a document is updated to when the updated document is available to queries) is an important consideration. However, there are several obstacles to providing fresh results. One obstacle is the expense or overhead associated with rebuilding the document index each time the document repository is updated. For example, significant overhead is often associated with building small indexes from new and updated documents and periodically merging the small indexes with a main index, and furthermore such systems typically suffer long latencies between document updates and availability of those documents in the repository index. A second obstacle is the difficulty of continuously processing queries against the document repository while updating the repository, without incurring large overhead. One aspect of this second obstacle is the need to synchronize both the threads that execute queries and the threads that update the document repository with key data structures in the data repository. The need to synchronize the query threads and repository update threads can present a significant obstacle to efficient operation of the document repository if document updates are performed frequently, which in turn is a barrier to maintaining freshness of the document repository.

SUMMARY OF DISCLOSED EMBODIMENTS

According to some embodiments, a method of processing documents includes storing a first version of a document in a repository, wherein the first version is within an accessible range of the repository; receiving a second version of a document; storing the second version in the repository; modifying the accessible range of the repository to include both the first version and the second version; invalidating the first version of the document; and executing queries against the repository in a plurality of threads, including continuing to execute queries without interruption during said operations of receiving the second version of the document, storing the second version of the document in the repository, modifying the accessible range of the repository, and invalidating the first version of the document.

BRIEF DESCRIPTION OF THE DRAWINGS

FIGS. 14A-14E are block diagrams illustrating the states of a tokenspace repository throughout the treadmilling of a document, in accordance with some embodiments.

Like reference numerals refer to corresponding parts throughout the drawings.

DETAILED DESCRIPTION OF EMBODIMENTS

Figure 1:
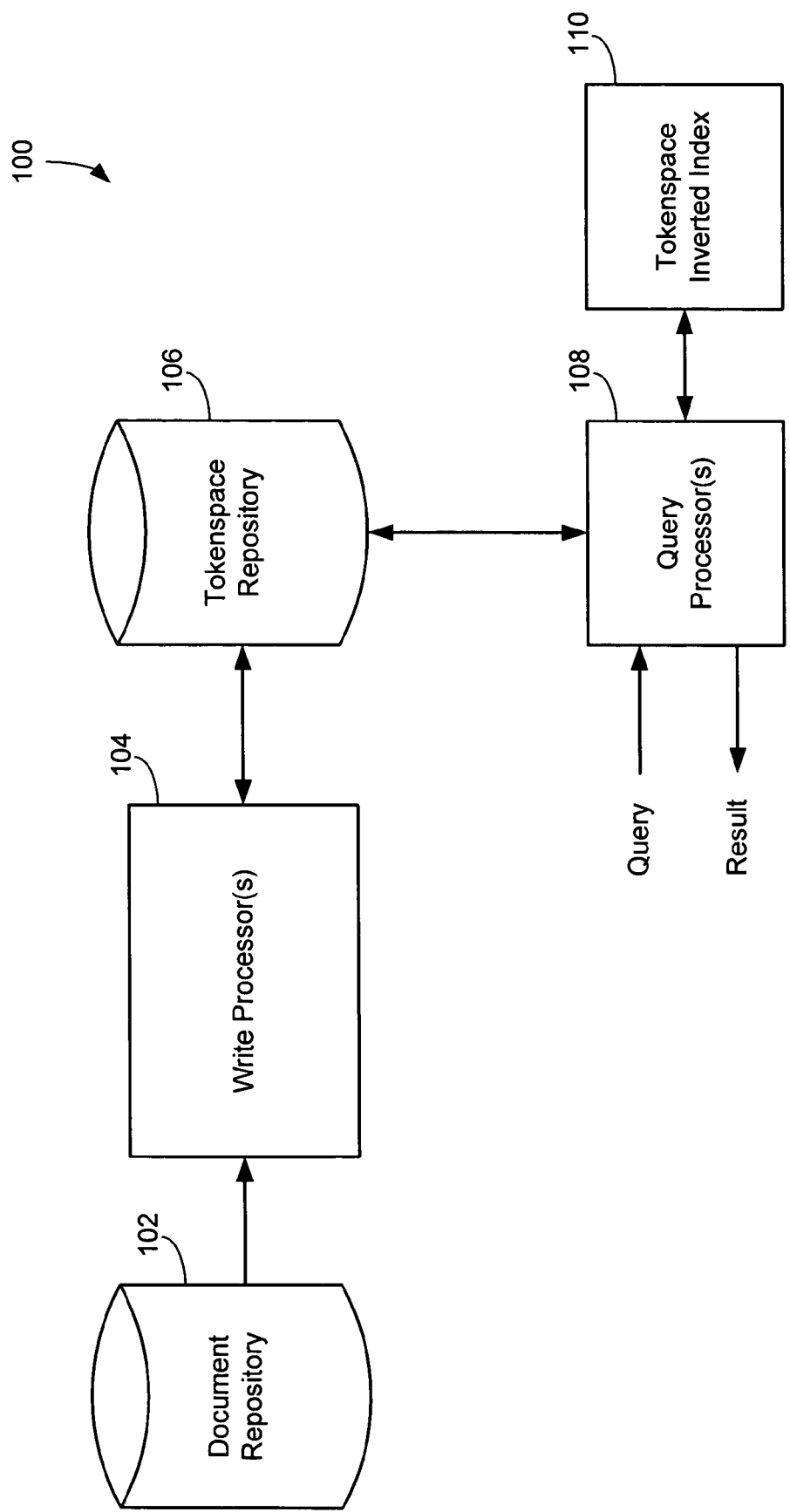
FIG. 1 is a block diagram illustrating an information retrieval system, in accordance with some embodiments.

FIG. 1 is a block diagram illustrating an information retrieval system, in accordance with some embodiments. The information retrieval system 100 includes one or more write processors or write threads (i.e., threads of execution in a processor or group of processors) 104 and one or more query processors or query threads 108. The write processor or thread 104 receives documents from a document repository 102 and populate a tokenspace repository 106 with the documents. Documents in the document repository 102 may be documents, web pages, emails, application specific documents and data structures, instant messaging (IM) messages, audio files, video files, and any other data or applications that may reside on one or more computer systems. The write processor or thread 104 also updates the tokenspace repository 106 whenever updates to the document repository 102 occur.

The tokenspace repository 106 stores the documents of the document repository 102 as a sequence of tokens. A "token" can be any object typically found in a document, including but not limited to terms, phrases, punctuation, HTML tags and the like. After parsing, a set of documents is represented as a sequence of tokens. Furthermore, each token in the sequence of tokens has a token position, which also represents the position of the token in the set of documents. For example, the first token in the set of documents may be assigned a position of 0, the second token in the set of documents may be assigned a position of 1, and so on. The write processor or thread 104 may generate a lexicon of all unique tokens in the tokenspace repository 106, further details of which are described below, in relation to FIG. 3.

The tokenspace inverted index 110 indexes the tokens of the tokenspace repository 106. More particularly, the tokenspace inverted index 110 maps tokens to their positions within the tokenspace repository 106. Further details regarding the tokenspace inverted index 110 are described below, in relation to FIG. 4.

In some embodiments, the tokens in the repository are fixed-length tokens. For instance, every token may occupy exactly 32 bits (4 bytes). In other words, every term, symbol, tag and the like that has been mapped to a unique token is represented by a respective fixed-length token value in the document repository. As a result, when the inverted index 110 index specifies that a particular token is found in positions A, B and C (e.g., 1041, 12349 and 992345) in the document repository 102, those positions in the repository can be accessed directly by treating the token positions as offsets from the start address of the document repository in memory, and then accessing the resulting memory locations.

The query processors or query threads (i.e., threads of execution in a processor or group of processors) 108 perform queries on the tokenspace repository 106. The query processors or threads 108 accept queries and return results of those queries. In some embodiments, the query processors or threads 108 parse a query into multiple query terms which are transformed by the query processor(s) 108 into a query expression (e.g., Boolean tree expression). The query terms are used to retrieve from the tokenspace inverted index 110 token positions. In response to the query terms, the query processor(s) 108 generate an ordered list of documents which are presented to the user via one or more modes of communication (e.g., display device, audio, etc.).

In some embodiments, the information retrieval system 100 may be distributed over a plurality of computers, such as servers. For example, the document repository 102 may be divided into a plurality of portions and each portion may be stored in its own tokenspace repository 106, with each tokenspace repository 106 residing on a separate server. Each document of the document repository 102 (and of the tokenspace repository 106) may be globally identified within the information retrieval system by a global document identifier and, within a portion, by a local document identifier.

Figure 2:
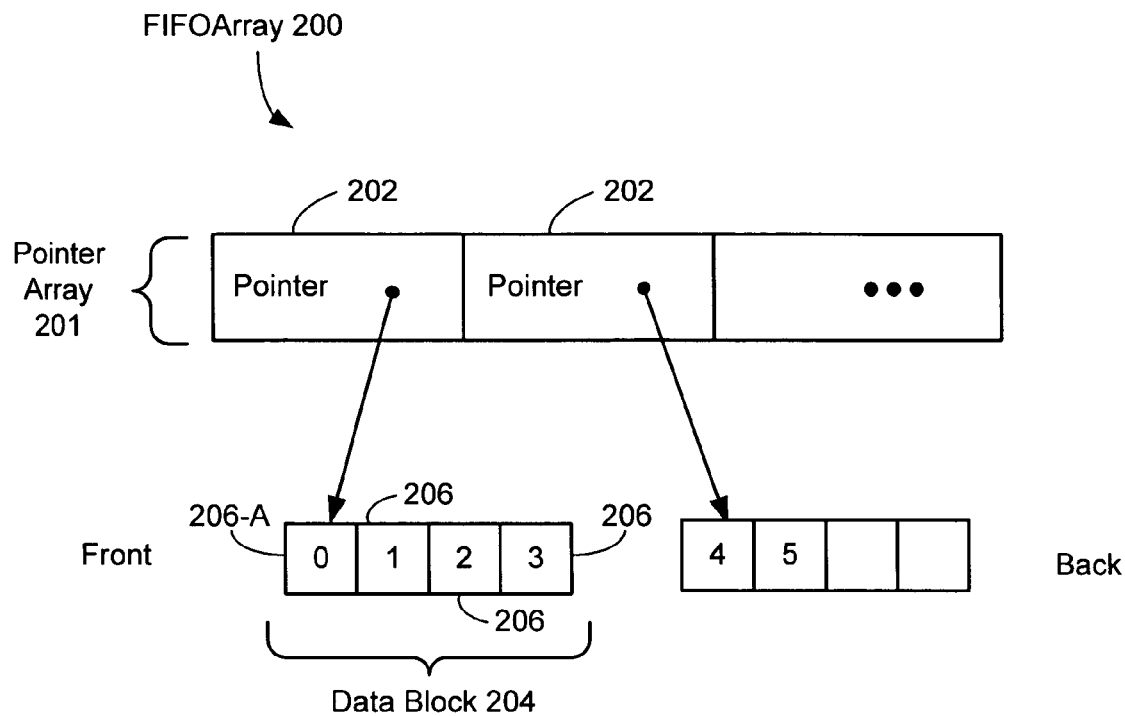
FIG. 2 is a block diagram illustrating a data structure with a first end and a second end, in accordance with some embodiments.

FIG. 2 is a block diagram illustrating a data structure with a first end and a second end, in accordance with some embodiments. In some embodiments, the information retrieval system 100 utilizes a data structure with a first end and a second end for at least some of its data storage. This data structure 200, called a first-in-first out (FIFO) array, has a contiguous array 201 of first level of pointers 202 and a second level of data blocks 204 of uniform size. The FIFO array 200 also has a "front" end and a "back" end. Each pointer 202 points to a data block 204. Each data block 204 includes a number of "cells" 206. While the data blocks 204 need not be stored in contiguous locations in memory, the pointers 202 are preferably stored in contiguous memory locations so as to enable simple indexed addressing into the array 201 of pointers 202. In some embodiments, the number of cells in a data block is an integer power of 2 (i.e., 2, 4, 8, 16, etc.). The cells 206 in the data blocks 204 form a sequence of cells. The size of a data block may vary depending on the type of data for which the FIFO array is being utilized, but the data blocks in the FIFO array are all of uniform size. A beginning value and an end value (not shown) specify the beginning and the end of the sequence of cells 206. In some embodiments, the beginning value specifies the first cell of the FIFO array that contains valid data, and the end value specifies the first available cell after the last occupied cell at the end of the FIFO array. The beginning and end values define the valid (accessible) range of the FIFO array 200.

In a FIFO array 200, data is inserted into the FIFO array 200 only at the back end and deleted from the FIFO array 200 only from the front end. In other words, new data is inserted into the first available cell in the back end. Data is deleted from the front end of the FIFO array 200; data from the "middle" cells cannot be deleted until it is at the front end. Thus, the cells in the FIFO array that have data form a contiguous sequence of "filled" cells with no empty cells in between. Due to the contiguous sequence, the offsets of the cells are also a contiguous sequence.

Because deletion can only be done to the data at the front end, periodically the data in the cells are "treadmilled." That is, valid data at the front end are copied to the back end and the original valid data at the front end are deleted. As valid data from the front end are moved to the back end, data in the cells between the front end and the back end are logically shifted to the front end, where it may be deleted if needed. Thus, treadmilling aids in the recovery of memory space that is occupied by data (sometimes called stale data) that is no longer valid. Further information regarding treadmilling is described below, in relation to FIGS. 13-15.

When a FIFO array 200 is first created, the pointer array 201 for a particular data structure (e.g., the document repository, or an index record) is given a predefined initial number of pointers 202 to data blocks. An unused pointer 202 (which may also be called a null pointer) is initially given a predefined value, such as zero (0) or minus one (−1), which is replaced with a pointer to a data blocks 204 when a corresponding data blocks is added to the FIFO array 200. As the FIFO array grows, more pointers 202 may be needed. When that need arises, a new pointer array 201 with additional space at the pointer level is created. The pointer values from the old pointer array 201 are copied to the new pointer array and the pointer array is deleted. The data blocks of the FIFO array 200 are retained during the pointer array 201 resizing operation. As noted above, the pointer array 201 is a contiguous array. The size of the new pointer array 201 may have a predefined relationship to the size of the old pointer array. For instance, the new pointer array may be twice the size of the old pointer array 201. Unused pointers 202 in the new pointer array are indicated by storing a predefined value (e.g., 0 or −1) in them.

In some embodiments, a similar procedure is used to recover wasted space in the pointer array 201 when data is deleted from a FIFO array 200. In particular, when a sufficient number of blocks at the front end of the FIFO array have been deleted, in accordance with predefined criteria, a new pointer array 201 is created, data from the old pointer array 201 is copied to the new pointer array, and the old pointer array is deleted. The data blocks of the FIFO array are not affected by this operation. In some other embodiments, unused or null pointers 202 at the front end of a FIFO array 200 are not recovered until the FIFO array 200 runs out of pointers 202 at the back end of the FIFO array 200 due to treadmilling (discussed below), growth of the amount of data in the FIFO array 200, or a combination of treadmilling and growth. At that time, when a new pointer array is created and pointers from the old pointer array are copied into the new pointer array, the first valid pointer in the old pointer array is copied into the first pointer 202 of the new pointer array (e.g., pointers at locations n to m in the old pointer array are copied to locations 0 to m-n in the new pointer array) so as to eliminate wasted space at the front end of the pointer array.

Figure 3:
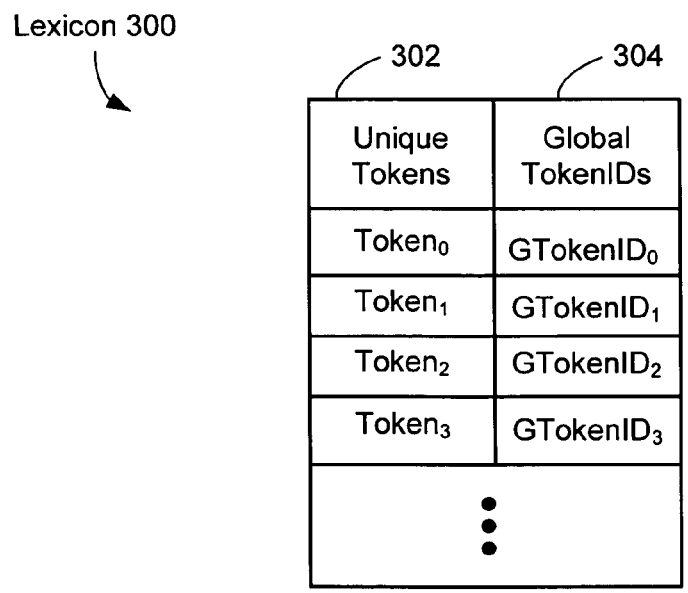
FIG. 3 is a block diagram illustrating a lexicon data structure, in accordance with some embodiments.

FIG. 3 is a block diagram illustrating a lexicon data structure, in accordance with some embodiments. The lexicon 300 maps unique tokens 302 (i.e., the text or sequence of symbols of each token) in the documents to a global token identifier 304. The write processor(s) 104 retrieves documents from the document repository 102 and generates the lexicon 300 by assigning unique global token identifiers (GTokenIDs) to each unique token contained in the documents. In some embodiments, the document repository 102 is logically or physically split into multiple portions, sometimes called partitions, and a separate lexicon 300 is generated for each partition. In one embodiment, a set of several billion documents is divided into several thousand partitions, each of which is processed to generate a lexicon 300. A typical lexicon 300 can include a few million unique tokens. In some embodiments, the lexicon 300 may be implemented as a hash table. That is, the GTokenID is the output of a hash function that has the token as the input.

Figure 4A:
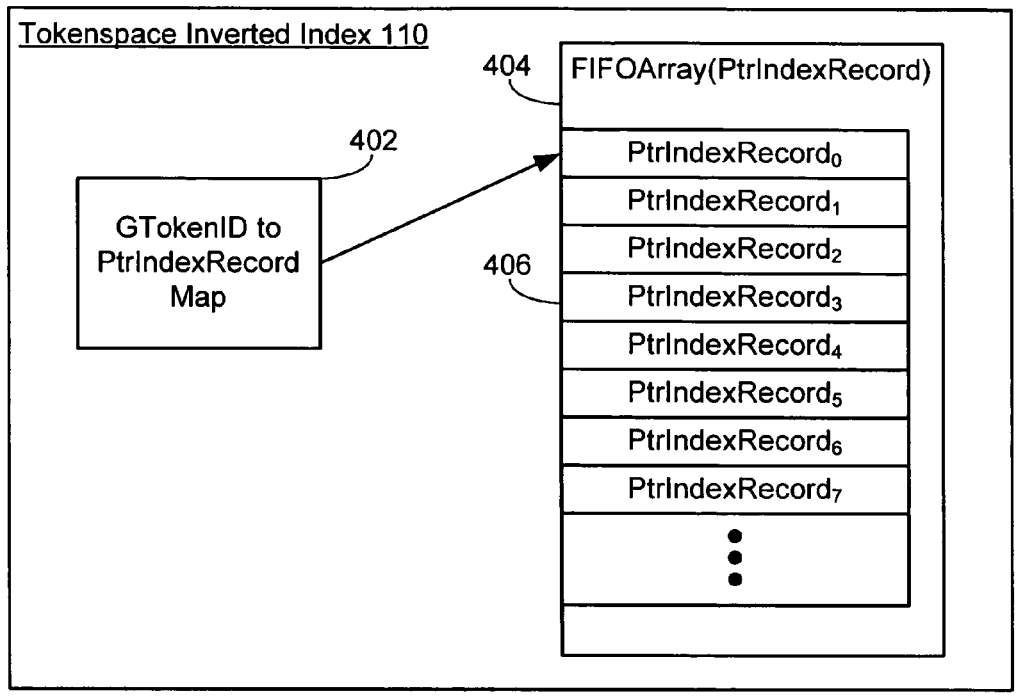
FIGS. 4A and 4B are block diagrams illustrating a tokenspace inverted index data structure, in accordance with some embodiments.
Figure 4B:
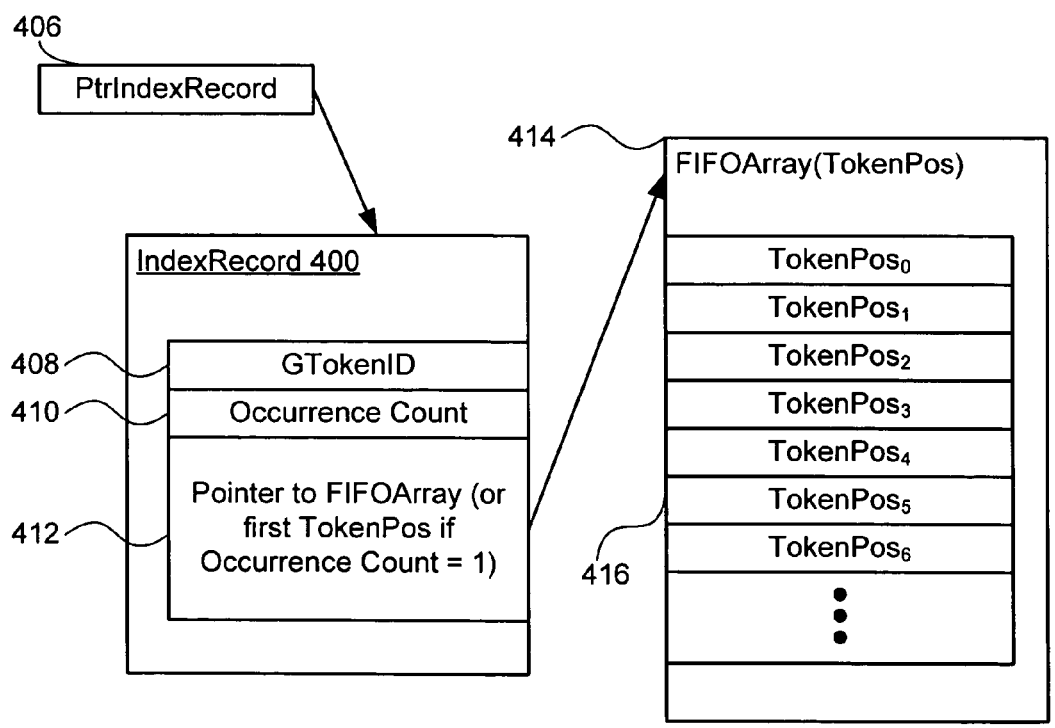

FIGS. 4A and 4B are block diagrams illustrating a tokenspace inverted index data structure, in accordance with some embodiments. The tokenspace inverted index 110 includes a mapping 402 of global token identifiers (GTokenIDs) to pointers (PtrIndexRecord) that point to their respective index records. The PtrIndexRecord's 406 are stored in the cells of a FIFO array 404. Each PtrIndexRecord 406 points to an index record 400. An index record 400 of a respective token record 400 includes the respective token 408 (or its corresponding GTokenID), a count 410 of the total number occurrences of the respective token in the tokenspace repository 106, and a pointer 412 to a FIFO array 414, where the token positions 416 of the respective token in the tokenspace repository 106 are stored. In some embodiments, if the occurrence count 410 is 1, then instead of having a FIFO array 414 and a pointer 412 to such, the single token position of the corresponding token in the tokenspace repository 106 is stored in place of the pointer 412.

When a document repository is divided into multiple partitions, the data structures shown in FIGS. 4A and 4B (and in the following figures as well) are for a single partition. The count 410 corresponds to the number of occurrences of a particular token in a particular partition. Except where otherwise noted, for purposes of this explanation, each partition of a document repository may be considered to be a document repository.

Figure 5:
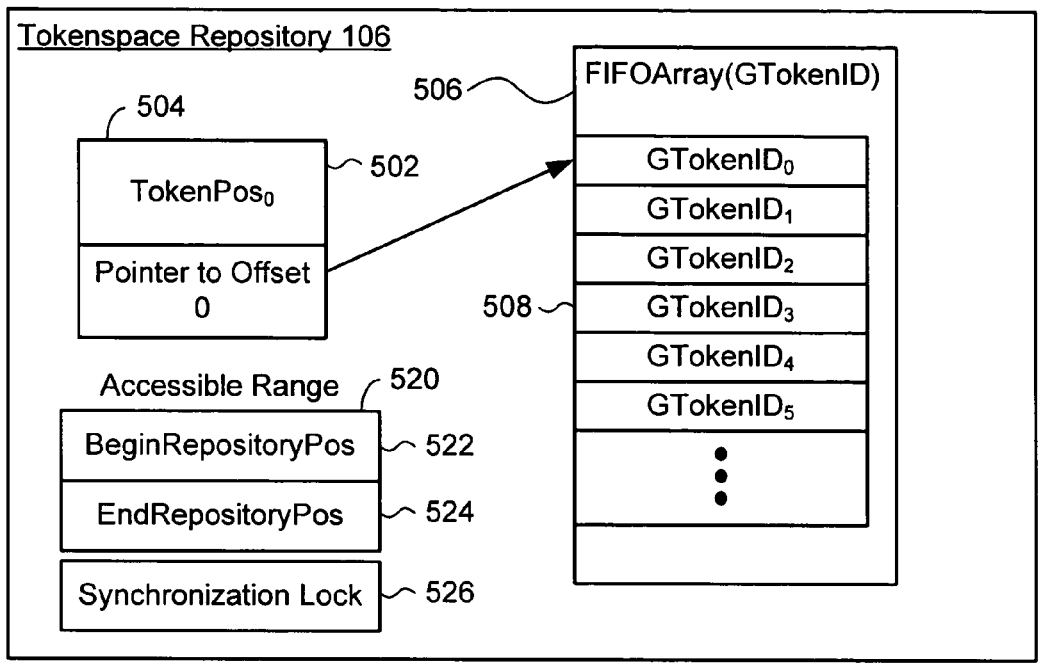
FIG. 5 is a block diagram illustrating a tokenspace repository data structure, in accordance with some embodiments.

FIG. 5 is a block diagram illustrating a tokenspace repository data structure, in accordance with some embodiments. The tokenspace repository 106 stores a sequence of tokens (or more particularly, their respective GTokenIDs) 508 that represent a set of documents. The sequence of tokens 508 is stored in a FIFO array 506. In some embodiments, the tokenspace repository 106 is periodically treadmilled, so that memory space occupied by stale documents that are no longer valid can be recovered. Further details regarding treadmilling are described below.

The tokenspace repository also includes an initial token position value (TokenPos$_0$) 502 and a pointer 504 to the cell at the front end (the cell at offset 0) in the FIFO array 506. It should be appreciated that the initial token position value 502 may be, but is not always, 0. The token position of a token in the sequence of tokens may be determined by adding the offset of the token in the FIFO array to the initial position value 502. In other words, the position of a token in the tokenspace repository 106 is TokenPos$_0$ plus the offset of the token in the FIFO array 506.

The tokenspace repository has an "accessible range" 520 that defines the range of documents accessible to queries being run against the tokenspace repository. The accessible range 520 is defined by a begin position 522, BeginRepositoryPos, and an end position 524, EndRepositoryPos. In some embodiments, the end position 524 is the offset from the beginning of the repository to the last valid token in the repository, and the begin position is the offset from the beginning of the repository to the first valid token in the repository. The accessible range 520 is a lock protected data structure, as described below, and thus has a synchronization lock data structure 526 associated with it. The synchronization lock data structure 526 may be a kernel data structure or any other appropriate data structure for synchronizing access to the accessible range 520. In some embodiments, the same synchronization lock data structure 526 is also used to synchronize access to the garbage collection list 900, described below.

In some embodiments, the tokenspace repository 106 may comprise a plurality of sectional repositories, each sectional repository storing particular sections of documents. For example, for a tokenspace repository 106 that stores webpages, there may be sectional repositories that store the bodies of the webpages, the Uniform Resource Locators (URLs) of the webpages, and the anchor texts of the webpages. Each sectional repository stores its content as a sequence of tokens. The sectional repositories are synchronized; the ordering of the content all follow the same ordering of documents. Their updates and treadmilling are also synchronized. More details regarding synchronizing section repositories are provided below.

Figure 6:
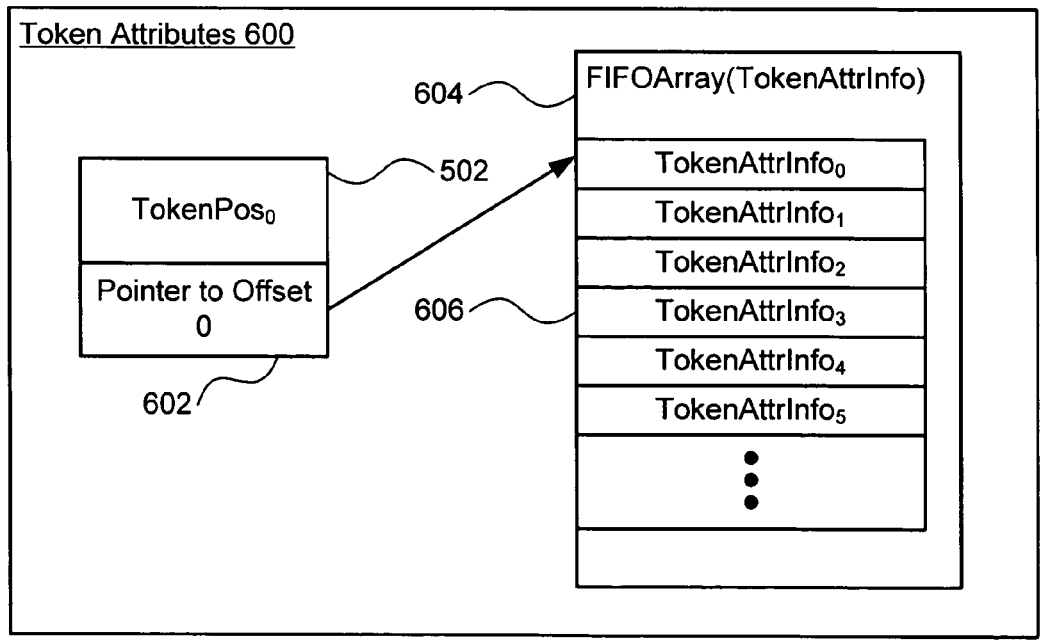
FIG. 6 is a block diagram illustrating a token attributes data structure, in accordance with some embodiments.

FIG. 6 is a block diagram illustrating a token attributes data structure, in accordance with some embodiments. The token attributes data structure 600 stores attributes corresponding to tokens in the tokenspace repository 106. In some embodiments, the token attributes may include things such as boldface, underlining, italics, font, font size, and so forth. The token attribute information 606 is stored in a FIFO array 604.

The token attributes data structure 600 also includes the initial token position value 502 and a pointer to 602 to the front end cell (the offset 0 cell) in the FIFO array 604. Thus, the token attribute information at position TokenPos$_0$+(offset in the FIFO array 604) is the token attribute information for the corresponding token at position TokenPos$_0$+(offset in FIFO array 506). Alternately, a respective instance of the token attribute information 606 may provide attribute information for K (e.g., 16, 32, 64 or 128) tokens, with bit arrays or other data structures being used to efficiently specify attributes for K tokens.

Figure 7:
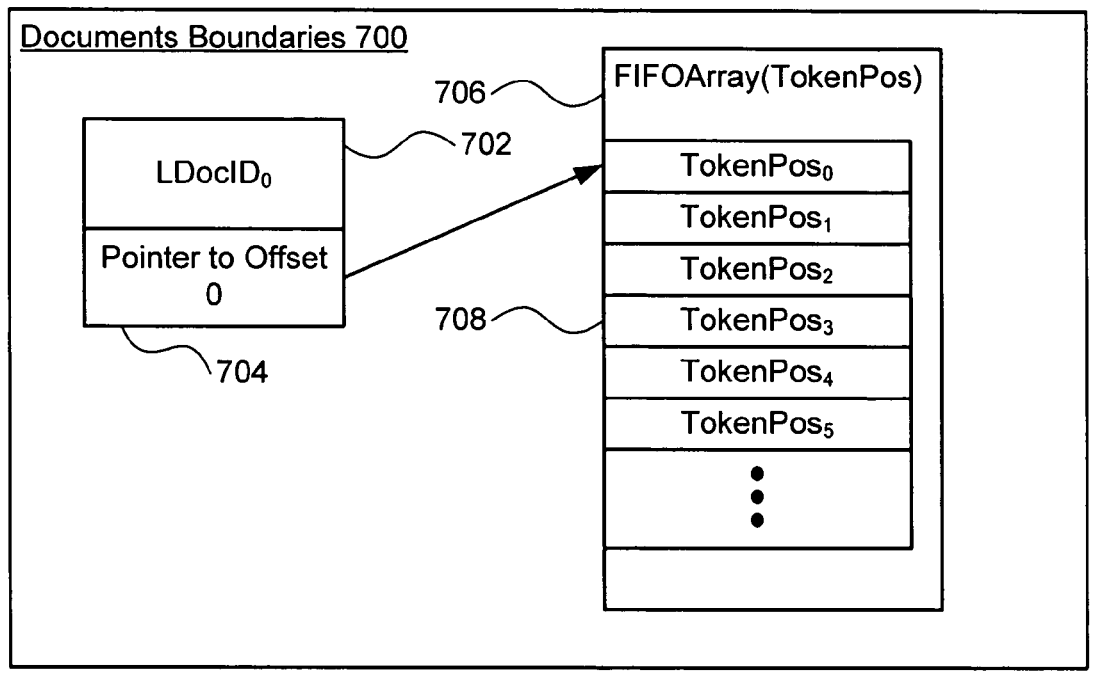
FIG. 7 is a block diagram illustrating a document boundaries data structure, in accordance with some embodiments.

FIG. 7 is a block diagram illustrating a document boundaries data structure, in accordance with some embodiments. The document boundaries data structure 700 store token positions that correspond to the boundaries of documents. In some embodiments, the document boundaries data structure 700 stores the token position of the last token in each document (the ending token position of each document). In some other embodiments, the document boundaries data structure 700 stores the token position of the first token in each document (the starting token position of each document).

The document boundaries data structure 700 includes the initial local document identifier (LDocID) value 702, a FIFO array 706 of token positions, and a pointer 704 to the offset 0 position in the FIFO array 706. The FIFO array 706 stores the token positions 708 in the tokenspace repository that correspond to document boundaries. Additional details regarding the local document identifier is described below, in relation to FIGS. 8A-8B.

Figure 8A:
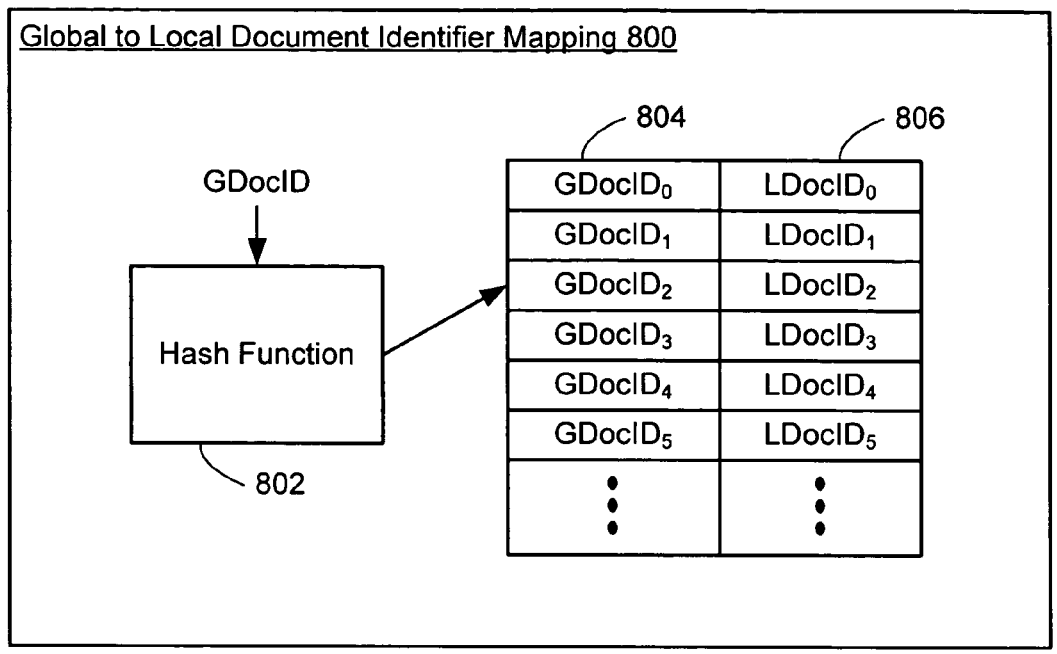
FIG. 8A is a block diagram illustrating a data structure for mapping global document identifiers to local document identifiers, in accordance with some embodiments.

FIG. 8A is a block diagram illustrating a data structure for mapping global document identifiers to local document identifiers, in accordance with some embodiments. Each document in the document repository 102 is assigned a global document identifier (GDocID) that globally identifies the document within the information retrieval system 100. In some embodiments, a document is assigned a GDocID by the write processor(s) when the write processor(s) processes the document for storage in the tokenspace repository 106. Each document may also have a local document identifier (LDocID) that identifies the document within a portion of the document repository 102. The global to local document mapping 800 maps the correspondences between the global document identifiers and the local document identifiers. In some embodiments, the mapping 800 may be implemented by a hash table. The mapping includes a hash function 802 for which the input is a GDocID 804 and the result is a corresponding LDocID 806. In some other embodiments, the mapping 800 may be implemented by a look-up table.

Figure 8B:
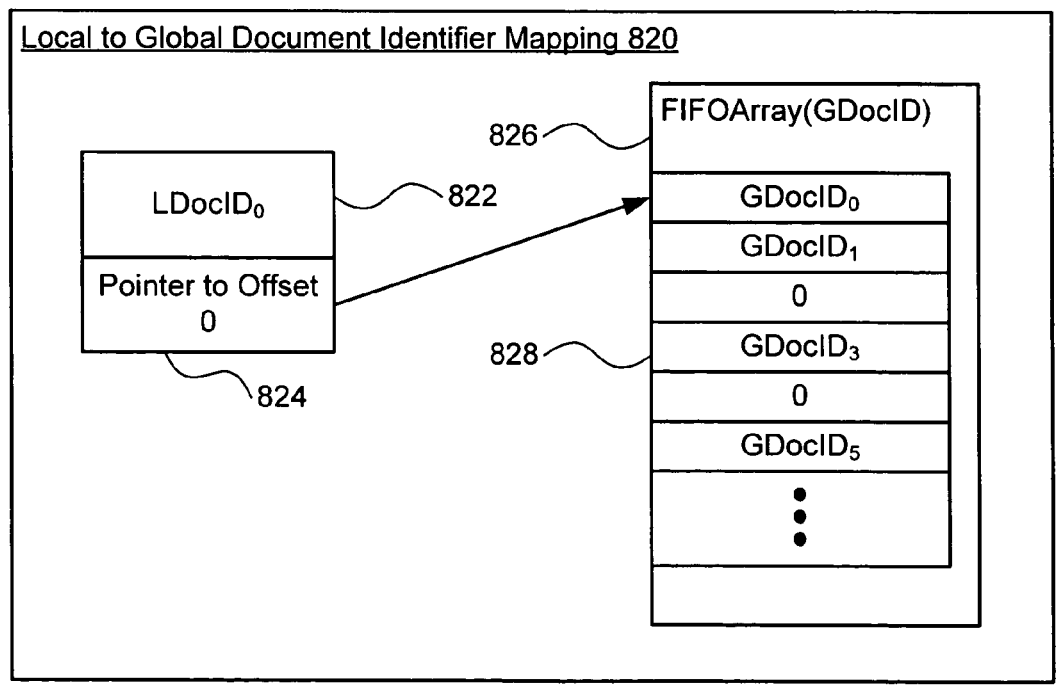
FIG. 8B is a block diagram illustrating a data structure for mapping local document identifiers to global document identifiers, in accordance with some embodiments.

FIG. 8B is a block diagram illustrating a data structure for mapping local document identifiers to global document identifiers, in accordance with some embodiments. The local to global document mapping 820 maps a local document identifier to a global document identifier. The mapping 820 includes the initial LDocID value 822, a FIFO array 826 of GDocID values, and a pointer 824 to the offset 0 position in the FIFO array 826. In some embodiments, the FIFO array 826 may, for some LDocID values, store a null value instead of the GDocID value. The null value indicates that the document identified by the LDocID has been invalidated. A document may be invalidated if it has been deleted from the document repository 102 or if the document is an older, obsolete version of another document in the document repository 102. A document that is deleted from the document repository 103 or made obsolete by a new version is marked invalid to indicate that it should no longer be used by new queries and that it should be deleted from the tokenspace repository 106. In the case of a document made obsolete by an updated version, the updated version takes on a new local document identifier and does not reuse the local document identifier of the old version (though the local document identifier of the old version may be reused in the future, as the pool of local document identifiers may be finite).

Figure 8C:
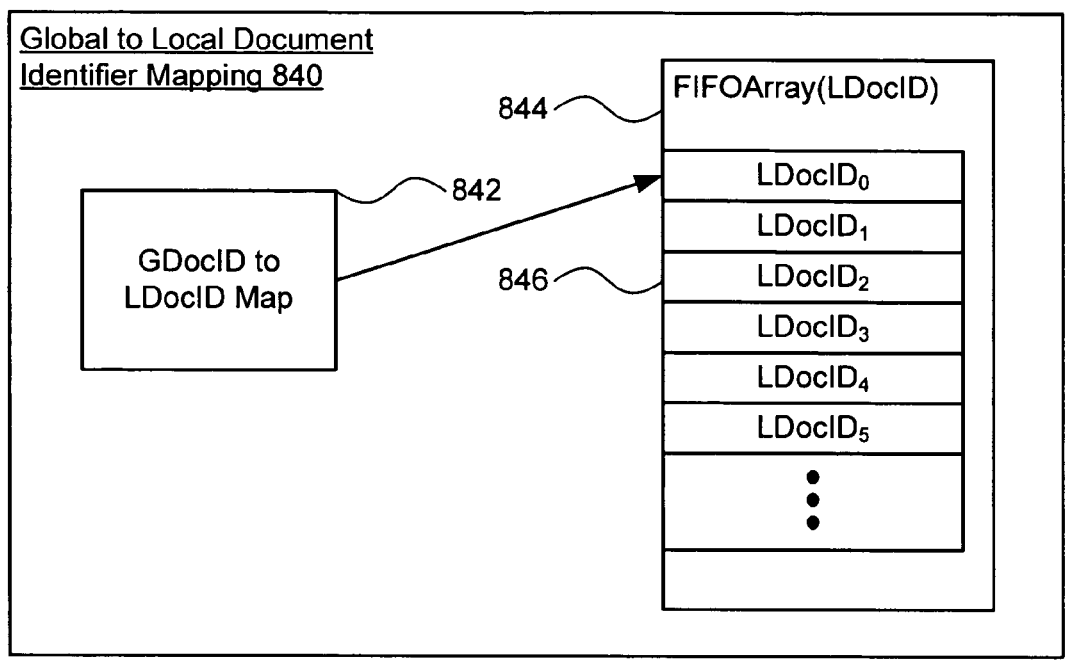
FIG. 8C is a block diagram illustrating an alternative data structure for mapping global document identifiers to local document identifiers, in accordance with some embodiments.

FIG. 8C is a block diagram illustrating an alternative data structure for mapping global document identifiers to local document identifiers, in accordance with some embodiments. The alternative global to local document mapping 840 includes a GDocID to LDocID map 842 and a FIFO array 844 of LDocIDs 846. The mapping maps a GDocID to a corresponding LDocID in the FIFO array 844.

Figure 9:
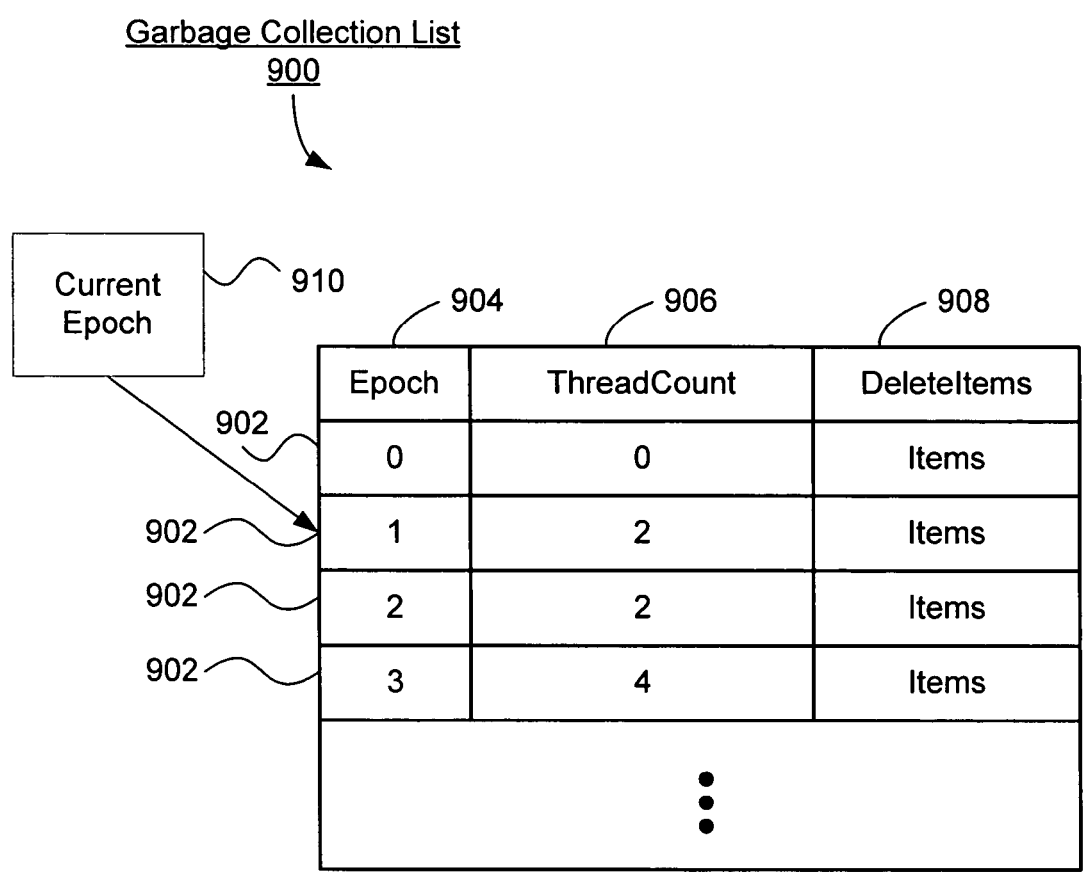
FIG. 9 is a block diagram illustrating a garbage collection list data structure, in accordance with some embodiments.

FIG. 9 is a block diagram illustrating a garbage collection list data structure, in accordance with some embodiments. The garbage collection list 900 includes one or more entries 902. Each entry includes an epoch indicator 904, a thread count 906, and a list 908 of data items to be deleted. The current epoch is indicated by a current epoch value 910. Each entry 902 corresponds to a particular epoch, as indicated by the epoch 904, and lists data items 908 to be deleted and a count of threads 906 in that particular epoch that are still running and using any of the data items 908 listed for that particular epoch. The data items identified by the list 908 for an epoch are deleted when the threads count 906 for the epoch reaches a predefined value. The garbage collection list 900 may have any number of entries 902, each corresponding to a particular epoch. Further details regarding epochs and garbage collection are described below, in relation to FIGS. 11A and 11B.

Figure 10A:
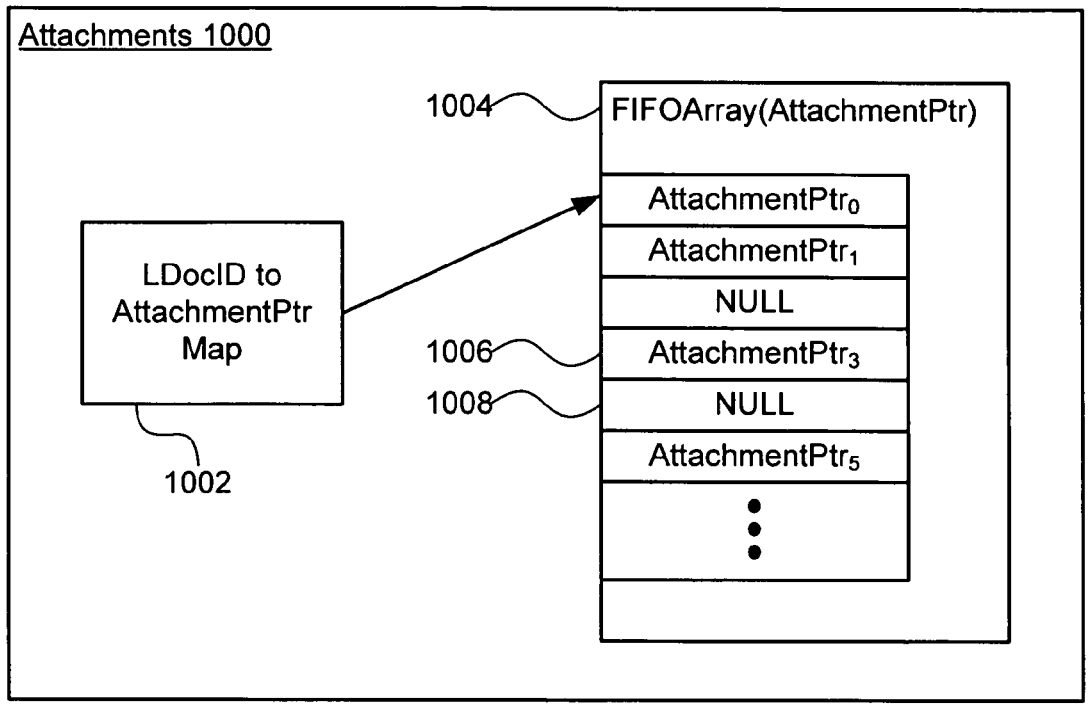
FIGS. 10A and 10B are block diagrams illustrating an attachments data structure, in accordance with some embodiments.
Figure 10B:
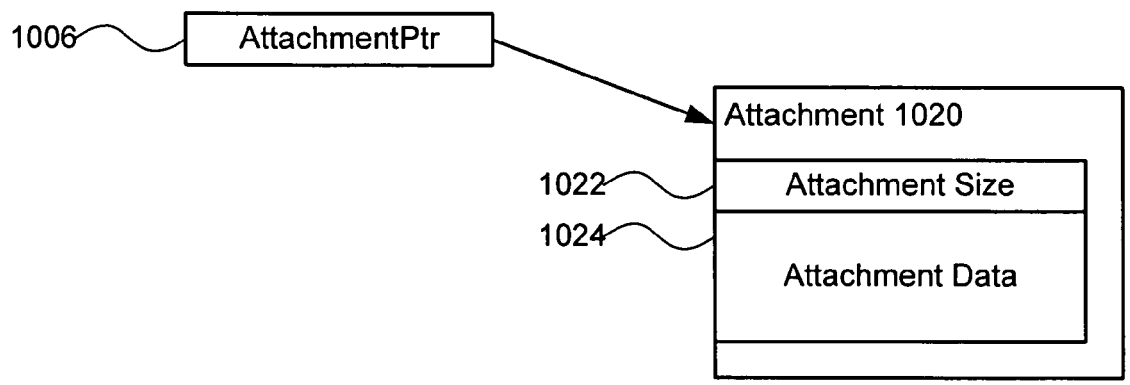

FIGS. 10A and 10B are block diagrams illustrating an attachments data structure, in accordance with some embodiments. Attachments are per-document data that are not searched by queries but may still be relevant. Attachments may include metadata such as document ranking, the language and encoding of a document (e.g., English, French, Japanese), the price of a product (if the document is a description of a product), etc. The attachments data structure 100 includes a LDocID to attachment pointer mapping 1002. The mapping 1002 maps a local document identifier to a pointer 1006, stored in a FIFO array 1004, that points to the attachment 1020 corresponding to the respective local document identifier. If a document does not have an attachment, the local document identifier of the document may map to a null pointer 1008. The attachment 1020 includes a size 1022 of the attachment data and the attachment data 1024. In some embodiments, the mapping 1002 may be implemented as an initial LDocID value plus offset scheme, similar to those described above.

Figure 11A:
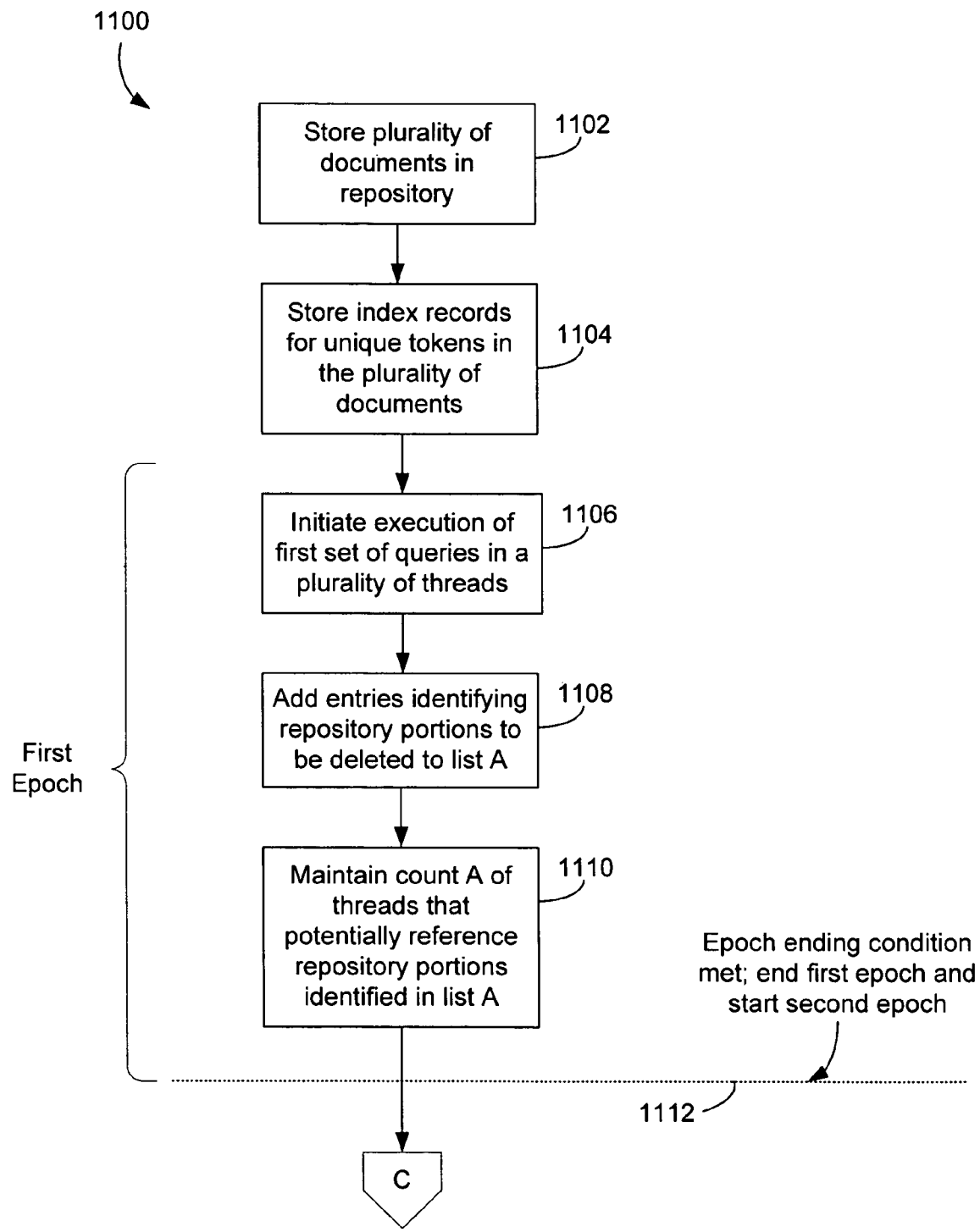
FIGS. 11A and 11B are flow diagrams of a process for garbage collecting data, in accordance with some embodiments.
Figure 11B:
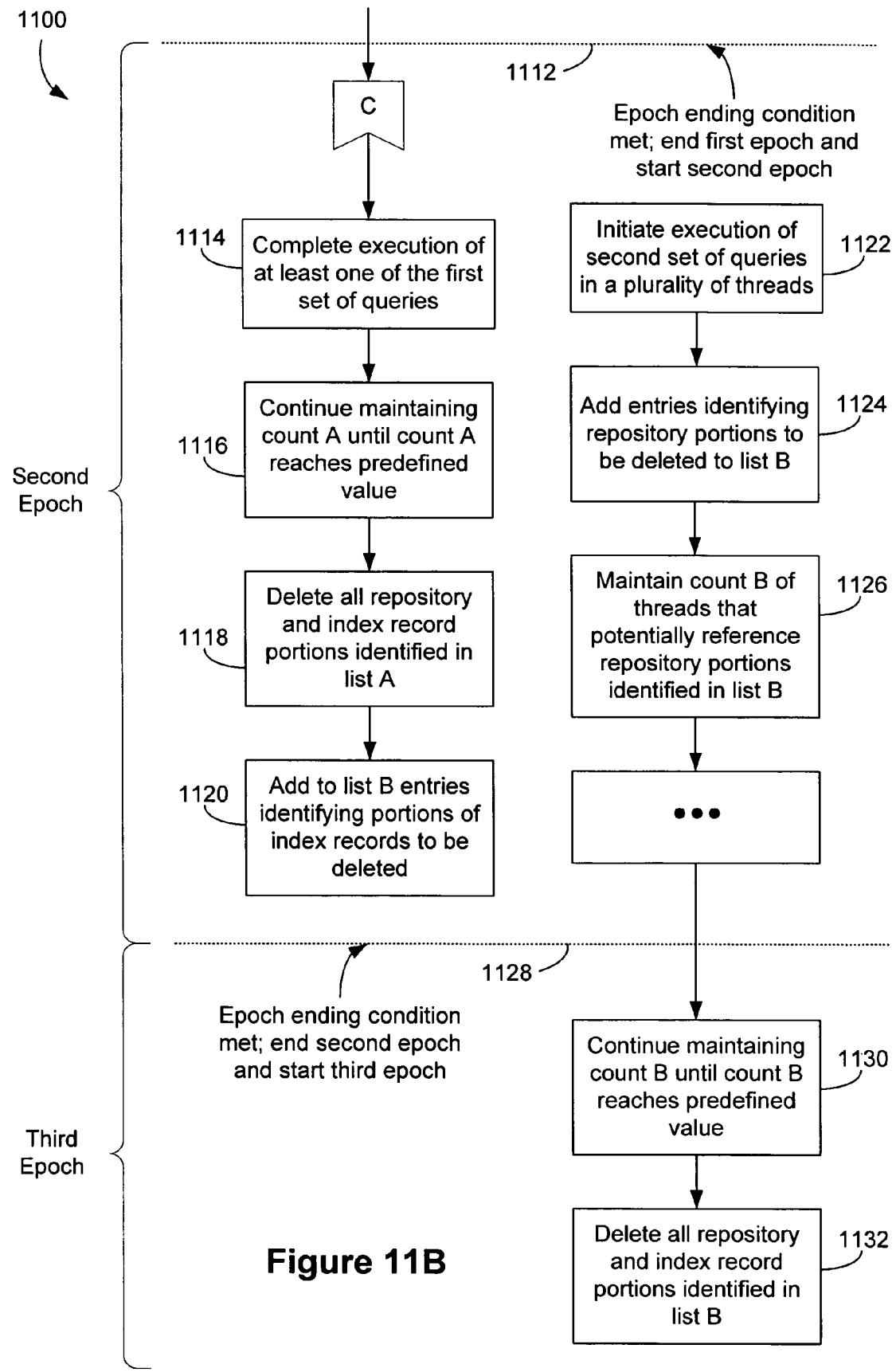

FIGS. 11A and 11B are flow diagrams of a process for garbage collecting data, in accordance with some embodiments. A document in the tokenspace repository 106 may be invalidated whenever it has been made obsolete by a new version or it has been deleted from the document repository 102. Invalidation of the document marks the document for eventual deletion. In some embodiments, that deletion includes de-allocation of the memory space in which is stored the document, i.e. recovery (reclamation) of that storage space in memory.

A plurality of documents is stored in a repository (1102). In some embodiments, the repository is a tokenspace repository 106 and the documents are stored in the repository as a sequence of tokens. Index records for unique tokens in the plurality of documents are stored (1104). The index records may be stored in a tokenspace inverted index 110.

In a first epoch, execution of a first set of queries is initiated in a plurality of threads (1106). These threads of execution are sometimes called query threads. While the queries are being executed, a number of documents in the repository may be updated and the older versions of these documents are added to a list of documents to be deleted. These documents are said to be "scheduled for deletion." However, active queries may still be referring to these documents. Thus, they are not deleted right away. Rather, they are marked for deletion, and actually deleted when they are no longer referenced by active threads.

Entries identifying portions of the repository (identified by token positions) that contain these documents to be deleted are added to a first list (hereinafter "list A" for convenience) (1108). The portions of the repository may be identified by the token positions of the tokens of the documents to be deleted. In some embodiments, entries identifying attributes and attachments corresponding to the documents may be added to list A as well. In some embodiments, list A corresponds to the data items 908 in an entry 902 of the garbage collection list 900 (FIG. 9) for the corresponding epoch. A first count (hereinafter "count A" for convenience) of threads that potentially reference the portions of the repository that are identified in list A is maintained (1110). Whenever a query is run, the thread in which the query is run grabs a lock on the garbage collection list entry 902 for the current epoch. After the lock is obtained by the query thread, the count 906 is updated and the current accessible range of the tokenspace repository is identified. Then the lock on the garbage collection list entry 902 is released. The query then is run on the tokenspace repository, using the identified accessible range of the tokenspace repository.

At some point, an epoch ending condition is met (1112). The first epoch ends, and a second epoch begins. In some embodiments, an epoch ending condition may be the elapsing of a predefined amount of time since the beginning of the first epoch. In some embodiments, an epoch ending condition corresponds to the number of documents which have been invalidated and scheduled for deletion. For example, an epoch ending condition may occur whenever the number of documents scheduled for deletion equals or exceeds D, where D is an integer greater than zero. When there are two or more epoch ending conditions, the current epoch is ended and another epoch begins when the first such epoch end condition becomes true. More generally, a current epoch may end and a new one may be started at any time, regardless of the state of the system. However, epoch ending conditions, such as the ones described above, may be specified and utilized to regulate the ending and beginning of epochs.

While in the second epoch, execution of a second set of queries is initiated in a plurality of threads (1122). As with the first epoch, a number of documents in the repository may have been updated and the old versions of the documents are scheduled for deletion. Entries identifying portions of the repository that contain these documents to be deleted are added to a second list (hereinafter "list B" for convenience) (1124). In some embodiments, list B corresponds to the data items 908 of a respective entry 902 of the garbage collection list 900 (FIG. 9), similar to list A. A second count (hereinafter "count B" for convenience) of threads that potentially reference the portions of the repository that are identified in list B is maintained (1126).

Also during the second epoch, execution of at least one of the first set of queries is completed (1114). Some of the first set of queries may have completed in the first epoch. More generally, a query of the first set of queries may complete execution in the first epoch (when it began execution) or in a subsequent epoch. Regardless of whether the queries of the first set are completed in the first epoch or in a subsequent epoch, count A continues to be maintained until it reaches a predefined value (1116). In some embodiments, as queries of the first set of queries complete execution, count A is decremented for each completed query, and count A is maintained until it reaches 0.

When count A reaches the predefined value, the portions of the repository that are identified in list A are deleted, provided that the thread counts for all previous epochs have also reached the predefined value (1118). In some embodiments, the predefined value is 0, indicating that there are no more active queries that potentially reference those documents identified in list A. Referring to FIG. 2, in some embodiments, deleting portions of the repository means reassigning the data blocks 204 for one or more invalidated documents to a list or heap of data blocks that are available for future use. In addition, when a data block 204 is removed from a FIFO array 200, the corresponding pointer 202 is given (i.e., overwritten with) a predefined "unused-pointer value," such as zero (0) or minus one (−1).

In some embodiments, list A may also identify portions of index records that correspond to portions of the repository that have been deleted in past epochs. In these embodiments, these portions of the index records (i.e., data blocks containing index entries for invalidated documents) are deleted as well during garbage collection operation 1118. Entries identifying index records portions corresponding to the portions of the repository that were identified in list A are added to list B for deletion at a later time (1120). More generally, when an invalidated document is garbage collected after the completion of a first epoch, the corresponding index items are garbage collected after the completion of the following epoch. As a result, the deleted data blocks are reassigned, and the pointers to the deleted data blocks are overwritten with the predefined unused-pointer value.

An epoch ending condition is met (1128). The second epoch ends, and a third epoch begins. While in the third epoch, count B continues to be maintained until it reaches a predefined value (1130). As with count A, count B is decremented for each query of the second set of queries that completes execution. When count B reaches the predefined value, the portions of the repository that are identified in list B are deleted, provided that thread counts for all previous epochs have also reached the predefined value. As noted, list B may identify index records for portions of the repository that have already been deleted (1132).

Thus, more generally, when an epoch i−1 ends, an epoch i begins with a zero thread count and an empty list of documents to be deleted. The thread count for epoch i is incremented for each query that begins execution during epoch i. The thread count for epoch is decremented for each of these queries (queries that began execution during epoch i) that complete execution, regardless of whether the query completes execution in epoch i or in a subsequent epoch. Documents scheduled for deletion during epoch i are added to the delete list for epoch i. The storage for the documents identified in the delete list for epoch i are reclaimed when the thread count for epoch i reaches the predefined value, provided that the thread counts of all previous epochs (i.e., i−1, i−2, . . . , 2, 1) also have reached the predefined value.

Figure 12:
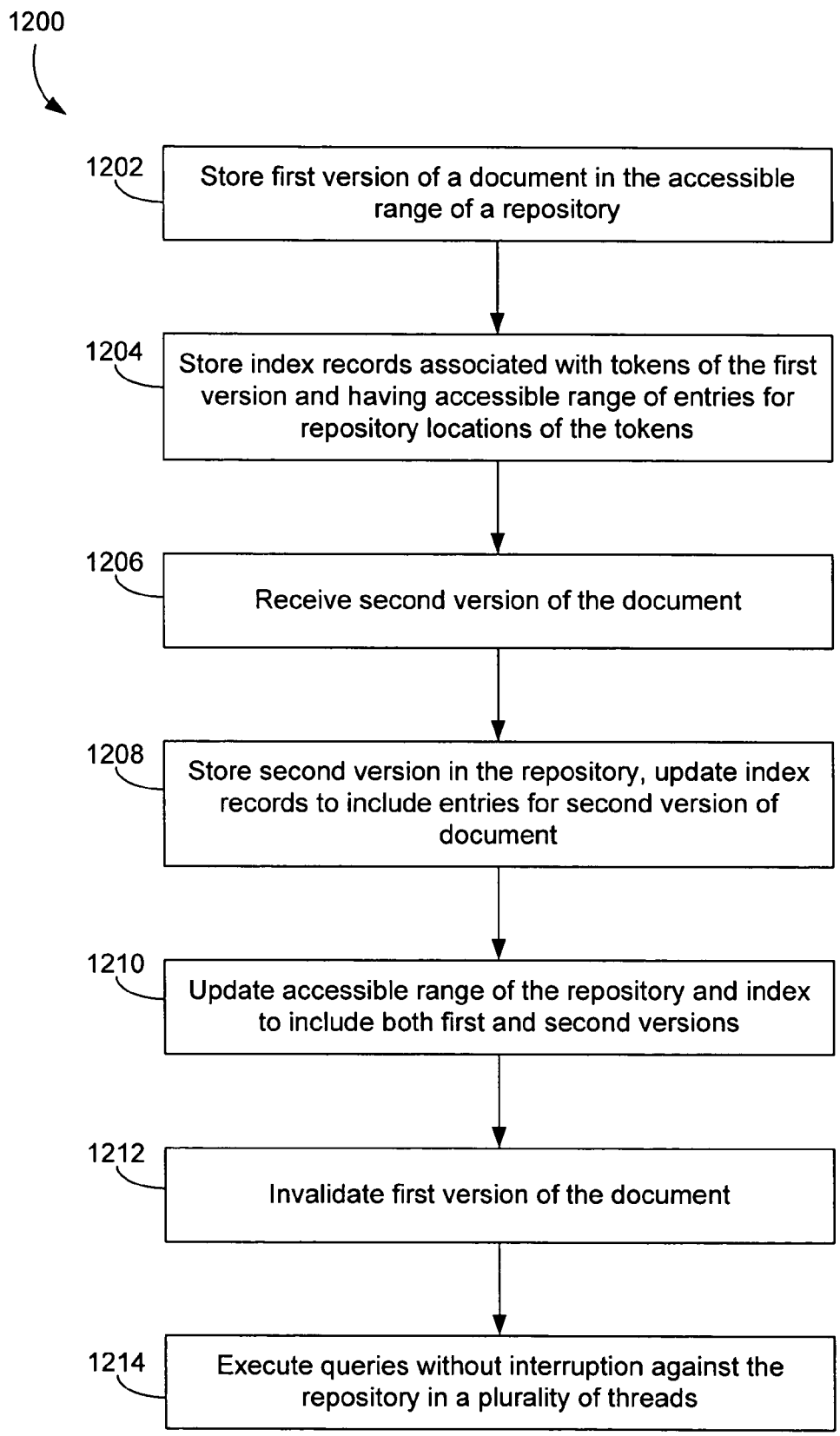
FIG. 12 is a flow diagram of a process for updating a document in a tokenspace repository, in accordance with some embodiments.

FIG. 12 is a flow diagram of a process for updating a document in a tokenspace repository, in accordance with some embodiments. A first version of a document is stored in the accessible range of a repository (1202). In some embodiments, the repository is a tokenspace repository 106, where documents are stored as a sequence of tokens. Index records associated with tokens of the first version of the document are inserted into the tokenspace inverted index (1204). The index record 400 (FIG. 4B) for a token includes a number of entries 416 that identify all repository locations (identified by token positions) at which the token may be found. If the index record for a token already exists, a second index record for the token need not be created; rather, the additional location(s) may be added to the preexisting index record.

A second version of the document is received (1206). The second version of the document is stored in the tokenspace repository and index records in the tokenspace inverted index 400 that correspond to tokens of the second version are updated to include entries for token positions corresponding to the second version (1208). At this point, the write processor(s) processing the update grabs a synchronization lock (e.g., lock 526, FIG. 5) on the tokenspace repository. While holding the lock, the write processor(s) updates the accessible range 520 (FIG. 5) of the tokenspace repository, such that both the first and second versions of the document are accessible by threads running queries (1210). The lock is then released. In other words, when the second version of the document is initially stored in the tokenspace repository, it is stored at the end of the tokenspace repository, outside the accessible range of the tokenspace repository. In some embodiments, the second version is made accessible to newly initiated queries (by changing the end position 524 of the accessible range 520 to point to the last token (in the tokenspace repository) of the second version of the document, while the first version is kept accessible for queries that may still need it.

The first version of the document is invalidated (1212). In some embodiments, the document is invalidated by storing a predefined value (e.g., 0) in the local to global document identifier mapping 820, as shown in FIG. 8B. The invalidation marks the first version of the document for deletion, but does not actually delete it. The token positions corresponding to the first version may be added to the garbage collection list 900 (FIG. 9) in preparation for deletion. In some embodiments, an invalidated document is added to the garbage collection list 900 when it is treadmilled to the front end of the tokenspace repository, further details of which are described below. Also, because of the invalidation, new queries (e.g., queries whose execution begins after the first version of the document is invalidated) can no longer use the first version of the document. While the first version is invalidated, queries against the repository are executed without interruption in a plurality of threads (1214). Even those queries that refer to the first version of the document, which has been invalidated, are executed without interruption.

Figure 17:
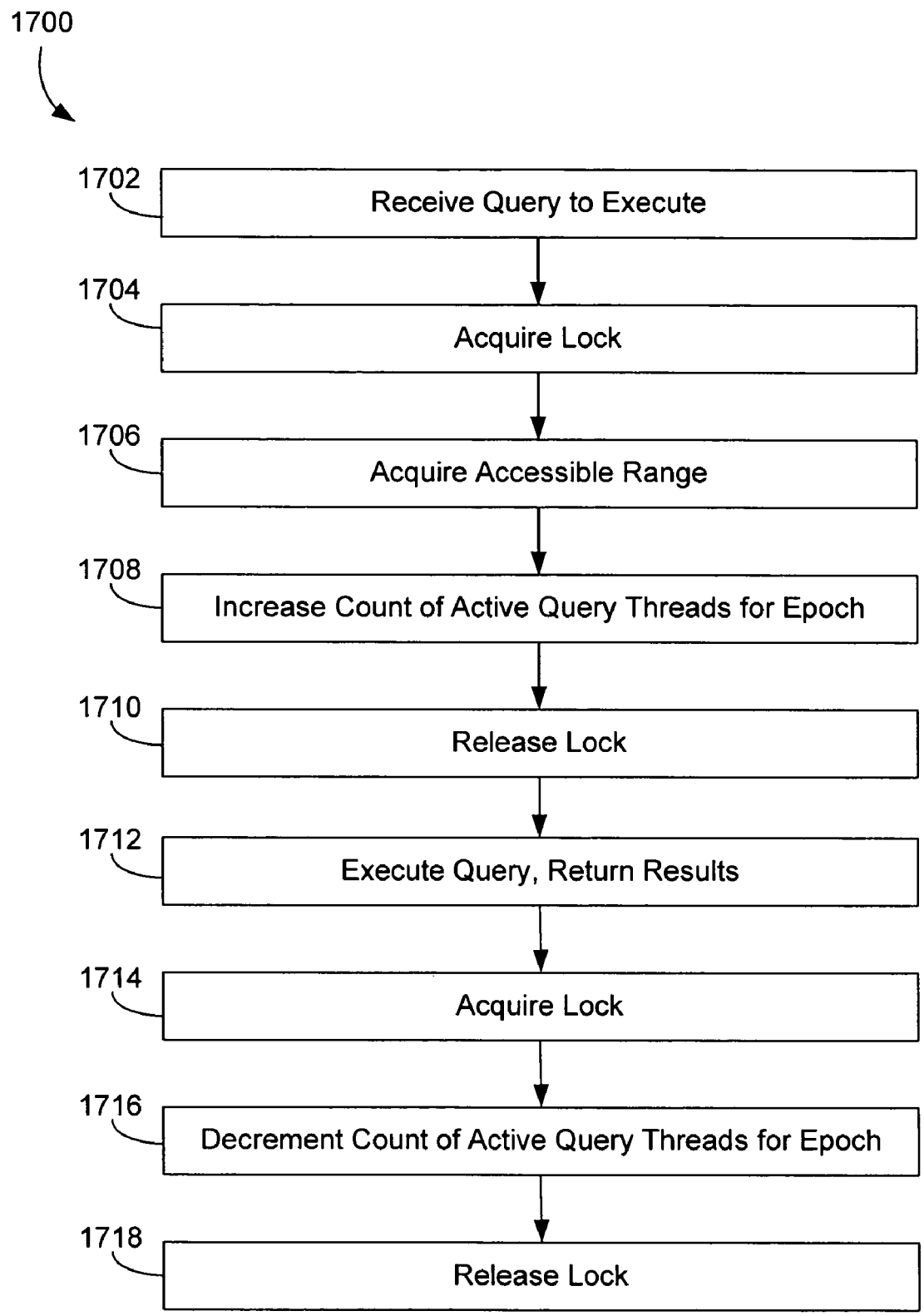
FIG. 17 is a flow diagram of a process for executing a search query, in accordance with some embodiments.

FIG. 17 is a flow diagram of the process 1700 performed by a query thread to execute a search query, in accordance with some embodiments. The query thread receives a search query to execute 1702. Before executing the query, the query thread performs some preliminary tasks that must be protected by a global lock (e.g., 526, FIG. 5) used to protect key data structures in the tokenspace repository 106. Thus, the query thread acquires the lock 1704, acquires the accessible range 1520 of the tokenspace repository 1706, increases the count (e.g., in the garbage collection list 900) of active query threads for the appropriate epoch 1708, and then releases the lock 1710. Operations 1706 and 1708 are performed only while the query thread is in possession of the lock to ensure the integrity of these operations. In some embodiments, one or more additional operations are performed by the query thread while in possession of the global lock. Possession of the global lock by one query thread does not prevent any other query thread from continuing to execute a query, but does force other query threads to wait before beginning the execution of a next query. Also, the write processor thread 104 cannot modify the accessible range of the tokenspace repository 106 while any query thread is in possession of the global lock for the tokenspace repository 106.

Next, the query thread executes the query and returns the query results 1712. In some embodiments, the query results may be returned to another thread, process or processor within the document processing server before the query results are sent to a client device or other server that initiated the search. Finally, the query thread once again acquires the global lock 1714, decrements the count of active query threads for the appropriate epoch 1716, and then releases the lock 1718. In some embodiments, operations 1714-1718 may be merged with operations 1704-1710 for a next search query, so as to reduce (by a factor of two) the number of lock acquisition operations performed by the query threads. However, it should be noted that the current epoch may be changed by the writer thread while a query thread is executing a query, in which case the decrement count operation 1716 will be performed on the count that was previously incremented for this query, while the increment count operation 1708 for the newly started query will be on a different count: that of a new current epoch.

Figure 13A:
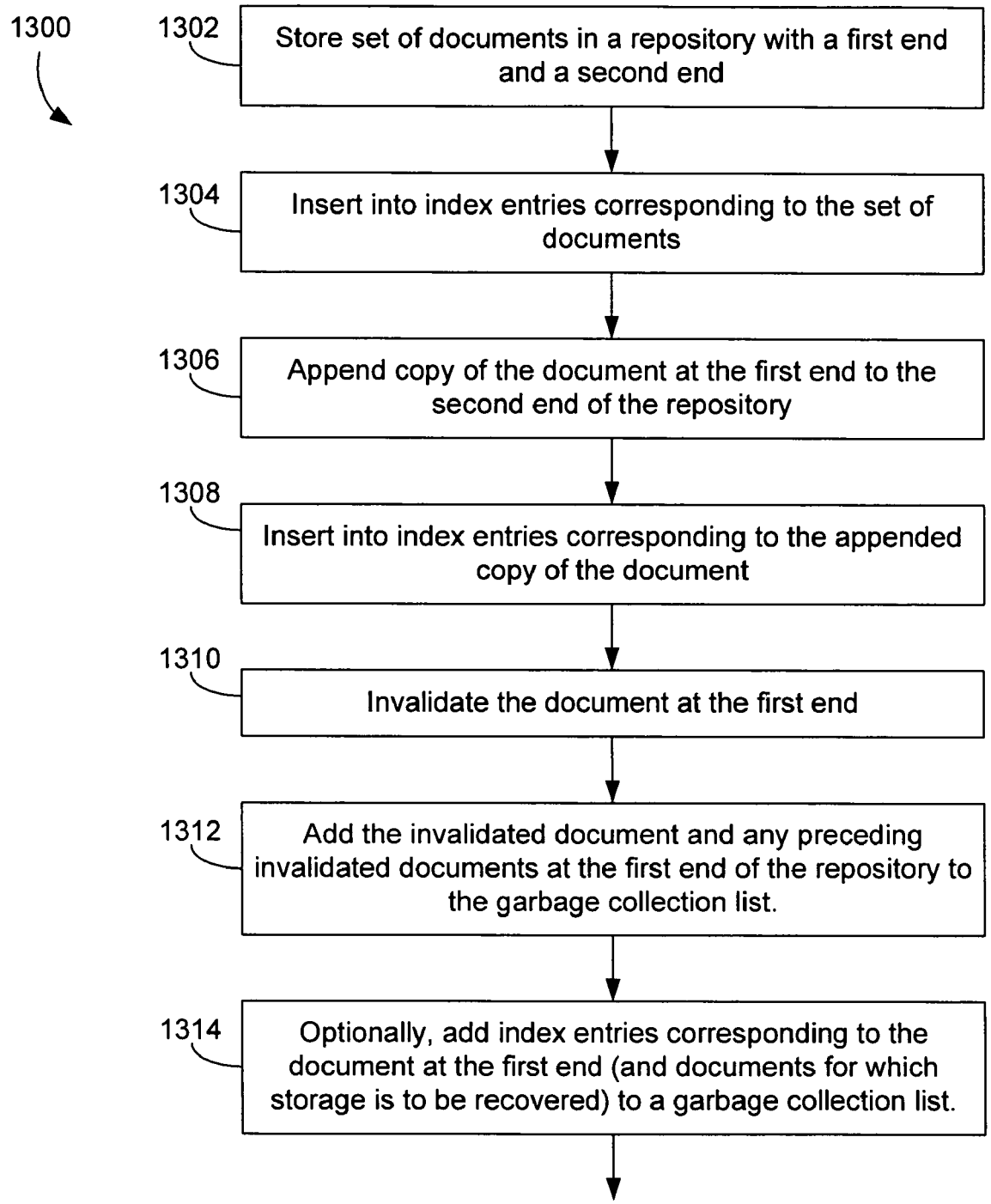
FIGS. 13A-13B are flow diagrams of a process for treadmilling a document in a tokenspace repository, in accordance with some embodiments.
Figure 13B:
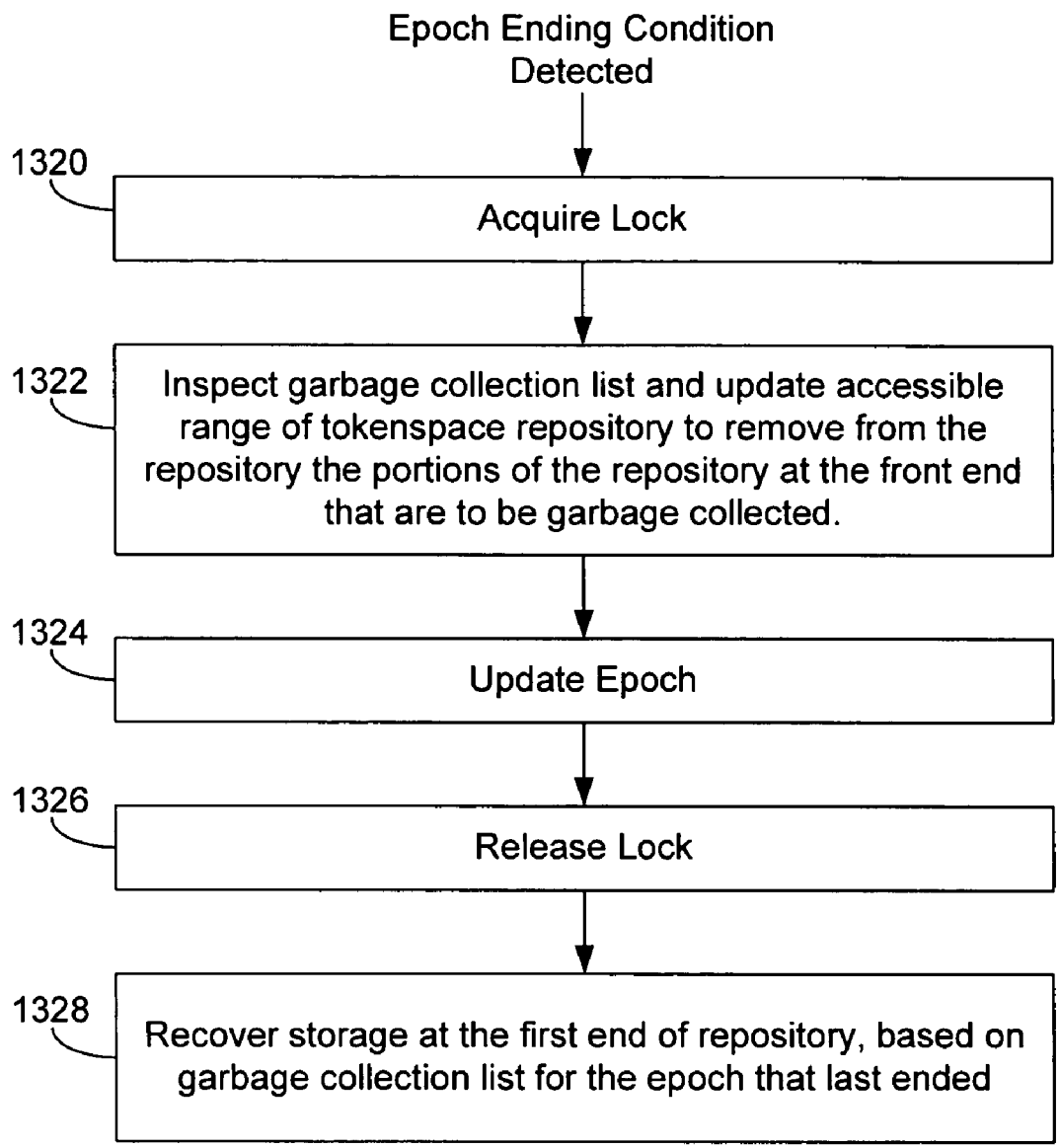

FIG. 13A is a flow diagram of a process for treadmilling a document in a tokenspace repository, in accordance with some embodiments. In some embodiments, the treadmilling process 1300 is performed periodically so as to treadmill a predefined number of documents per unit of time. As described above, the tokenspace repository may be treadmilled to aid in the garbage collection of memory space occupied by invalid documents. As noted above, invalid documents include stale documents that have been replaced by more current versions of those documents. A set of documents is stored in a repository with a first end and a second end (1302). In some embodiments, the tokenspace repository is stored in a FIFO array 200 with a front end and a back end. Entries corresponding to tokens in the stored set of documents are inserted into an index, such as the tokenspace inverted index 400 (FIG. 4A) (1304). The entries identify repository locations (identified by token positions) where corresponding tokens are stored.

A copy of the document at the front end is appended to the repository at the back end (1306). In a FIFO-array tokenspace repository, a copy of the document that is at the front end (or more particularly, the sequence of tokens that make up the document) is appended to the back end of the tokenspace repository. However, this copy operation is done only if the document at the front end is valid. If the document at the front end is invalid, the documents at the front end are inspected, in sequential order (which, in some embodiments is also in the same order as their local document identifiers) until a first valid document is found, and that valid document is copied and appended to the back end. Entries identifying repository locations corresponding to the appended copy of the document are inserted into the index (1308).

The document at the front end, a copy of which was appended to the back end in block 1306, is invalidated (1310). The invalidated document is added to the garbage collection list 900 for eventual deletion. More generally, the treadmilled document and any preceding invalid documents at the front end of the repository are added to the garbage collection list 900 for eventual deletion (1312). In addition, if the document immediately following the treadmilled document is invalid, then that document and any immediately following invalid documents (i.e., documents stored in a contiguous tokenspace range without any intervening valid documents) are added to the garbage collection list 900 for eventual deletion. As a result, the treadmilled document and an expandable window of neighboring invalid documents, occupying a contiguous tokenspace range without any intervening valid documents, are added to the garbage collection list 900 for eventual deletion.

In some embodiments, index entries identifying repository locations corresponding to the invalidated document may also be added to a garbage collection list (1314). See the above discussion (and FIG. 11B, operations 1118 and 1120) concerning garbage collection of index entries.

Storage at the front end of the tokenspace repository is recovered (1328, FIG. 13B) only after an epoch ending condition is detected. As noted above, the recovery may be performed when the corresponding thread count 906 and thread counts for all previous epochs reach the predefined value. In some embodiments, storage recovery is performed periodically on the tokenspace repository, recovering storage space from invalidated documents that have been treadmilled to the front end, added to the garbage collection list 900, and for which the corresponding thread counts 906 have reached the predefined value. The recovered storage includes the storage space of the document at the front end that was invalidated at block 1310, as well as the storage space of any previously invalidated documents located prior to the treadmilled document at the front end of the repository. The recovered storage corresponds to a contiguous set of pointers 202 in the pointer array 201 of the tokenspace repository.

When an epoch ending condition is detected, and prior to recovering unused storage at the front end of the tokenspace repository (1328), the write thread acquires the global lock 1320 so that it can perform two or more protected operations. In particular, it updates the accessible range 520 (FIG. 5) of the tokenspace repository so as to exclude the portion of the tokenspace repository corresponding to the garbage collection list for the epoch that just ended (1322). It also updates the current epoch 910 (FIG. 9), 1324, for example by incrementing an epoch count value. After performing these operations, and optionally other operations that require global lock protection, the global lock is released 1326. The order of operations 1322 and 1324 may be reversed in other embodiments. While garbage collection operation 1328 is described here as occurring after the global lock is released, in other embodiments, the garbage collection operation 1328 is performed while write thread is still in possession of the global lock.

In some embodiments, the "treadmilling" of documents may occur over two repositories rather than within one. That is, the tokenspace repository may comprise two repositories, hereinafter called repositories J and K for convenience. Initially repository J is the primary repository, which means that all the documents in the repository are stored at repository J. New documents are also added to repository J. During treadmilling, valid documents in repository J are copied to repository K. When all the valid documents in repository J have been copied to repository K, repository K becomes the primary repository, and the storage space in repository J is reclaimed. Now, repository K takes on the role of storage for valid documents and the location to which new documents are added. During the next treadmilling, valid documents in repository K are copied to repository J. When all the valid documents in repository K have been copied to repository J, the storage space in repository K is reclaimed, and the repositories J and K switch roles. In some embodiments, whenever documents are treadmilled from repository J to repository K, or vice versa, the token position space is reset. That is, token positions are reassigned from position 0, rather than from the last used position. This has the benefit of delaying, and possibly preventing, depletion of the token position space.

Thus, in some embodiments, a method of processing documents may include: storing a set of documents as a first sequence of documents in a first repository; invalidating a subset of the documents in the sequence; copying the valid (i.e., non-invalidated) subset of the first sequence of documents to a second repository as a second sequence of documents; and recovering storage space associated with the first repository. The method may further include invalidating a subset of the second sequence of documents; copying the non-invalidated subset of the second sequence of documents to the first repository as a third sequence of documents; and recovering storage space associated with the second repository.

FIGS. 14A-14E are block diagrams illustrating the states of a tokenspace repository throughout the treadmilling of a document, in accordance with some embodiments. FIG. 14A shows a tokenspace repository at some instant. The repository has Doc1, Doc2, . . . , DocN stored within. The repository also has an accessible range, which includes the locations of the repository that queries may refer to and access. In some embodiments, the tokenspace repository is a FIFO array. In FIGS. 14A-14E, the left end of the repository is the front end and the right end is the back end. In FIG. 14A, Doc1 is located in the front end, and DocN is located in the back end.

In FIG. 14B, Doc1 is treadmilled to the back end. A copy of Doc1 is appended to the back end, after DocN. The copy, DocN+1 has the same content as Doc1 but has a different local document identifier. In some embodiments, that local document identifier is the next local document identifier in the sequence of local document identifiers, after that of DocN. In FIG. 14C, Doc1 is invalidated. At this point, the accessible range of the repository includes both Doc1 and DocN+1. Doc1 is still in the accessible range because some queries may still be referring to it. The token positions of Doc1 are added to the garbage collection list 900 for eventual deletion. In FIG. 14D, storage space for the invalid Doc1 is recovered. The accessible range is updated to no longer include Doc1. After the storage space recovery and the updating of the accessible range, the repository takes the form shown in FIG. 14E. Doc2 is at the front end and DocN+1, which has the contents of Doc1, is at the back end.

Figure 15A:
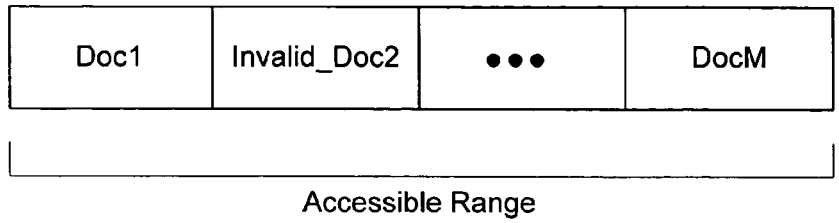
FIGS. 15A-15E are block diagrams illustrating the states of a tokenspace repository throughout the treadmilling of a document adjacent to an invalid document, in accordance with some embodiments.

FIGS. 15A-15E are block diagrams illustrating the states of a tokenspace repository throughout the treadmilling of a document adjacent to an invalid document, in accordance with some embodiments. As with FIGS. 14A-14E, the left end is the front end and the right end is the back end. FIG. 15A shows the tokenspace repository at some instant. In the repository, Doc1 is the document at the front end. An invalid Doc2 follows Doc1. DocN is located in the back end of the repository.

Figure 15B:
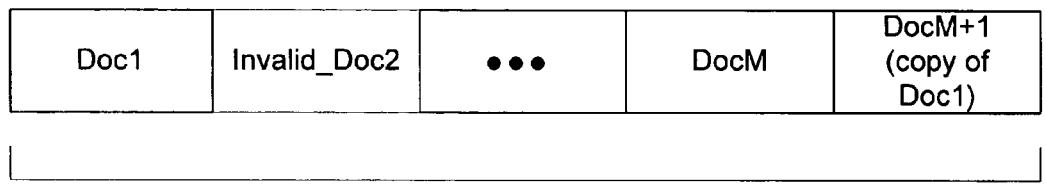
Figure 15C:
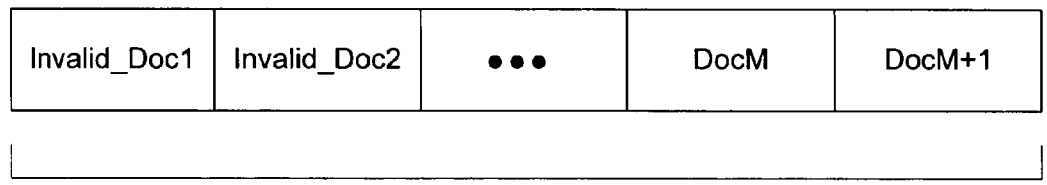
Figure 15D:
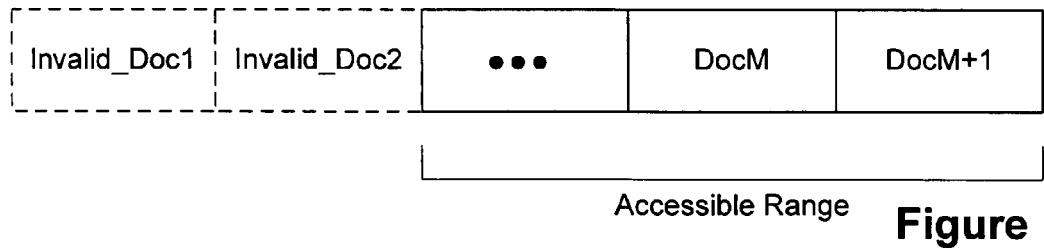
Figure 15E:
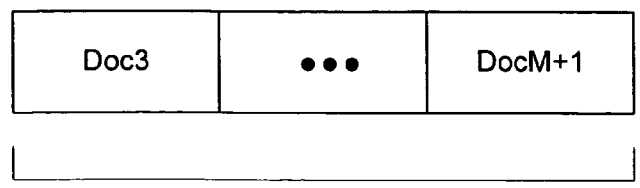

In FIG. 15B, Doc1 is treadmilled to the back end. A copy of Doc1 is appended to the back end, after DocN. The copy, DocN+1 has the same content as Doc1 but has a different local document identifier. In some embodiments, that local document identifier is the next local document identifier in the sequence of local document identifiers, after that of DocN. Doc1 is invalidated, as shown in FIG. 15C. However, the accessible range of the repository still includes the invalidated Doc1 and the invalidated Doc2. The token positions of Doc1 are added to the garbage collection list 900 for eventual deletion. The storage space for the invalidated Doc1 and Doc2 are recovered, as shown in FIG. 15D. The accessible range of the repository is also updated. After the storage space recovery and the updating of the accessible range, the repository takes the form shown in FIG. 14E. Doc3 is at the front end and DocN+1, which has the contents of Doc1, is at the back end.

When a document is invalidated, its associated data, such as attributes corresponding to the tokens of the document, any attachments associated with the document, and inverted index entries corresponding to the token positions of the document are also invalidated. The data structures that hold these associated data are also treadmilled periodically to reclaim the memory space occupied by the invalidated data.

As described above, in some embodiments, the tokenspace repository 106 may include a plurality of sectional repositories. For example, a tokenspace repository that stores webpages may have sectional repositories for the bodies of webpages, anchor texts, and URLs. Whenever a section of a document is updated but the other parts are unchanged, all of the sectional repositories are "updated"; the sectional repositories are synchronized. For example, if the body of a webpage has been updated but the anchor text and URL remains the same, then the sectional repository for webpage bodies is updated with the new content by appending the new content to the back end of the sectional repository and the old content is invalidated. The anchor text sectional repository is "updated" by appended the unchanged anchor text to the back end and invalidating the older version of the same anchor text. For the URL repository, the same URL is appended to the back end and the older version of the same URL is invalidated. Similarly, the sectional repositories are also synchronized in their treadmilling: when a document is treadmilled, the information for the sections of the document is appended to the back end in their respective repositories and their older versions are invalidated.

Figure 16:
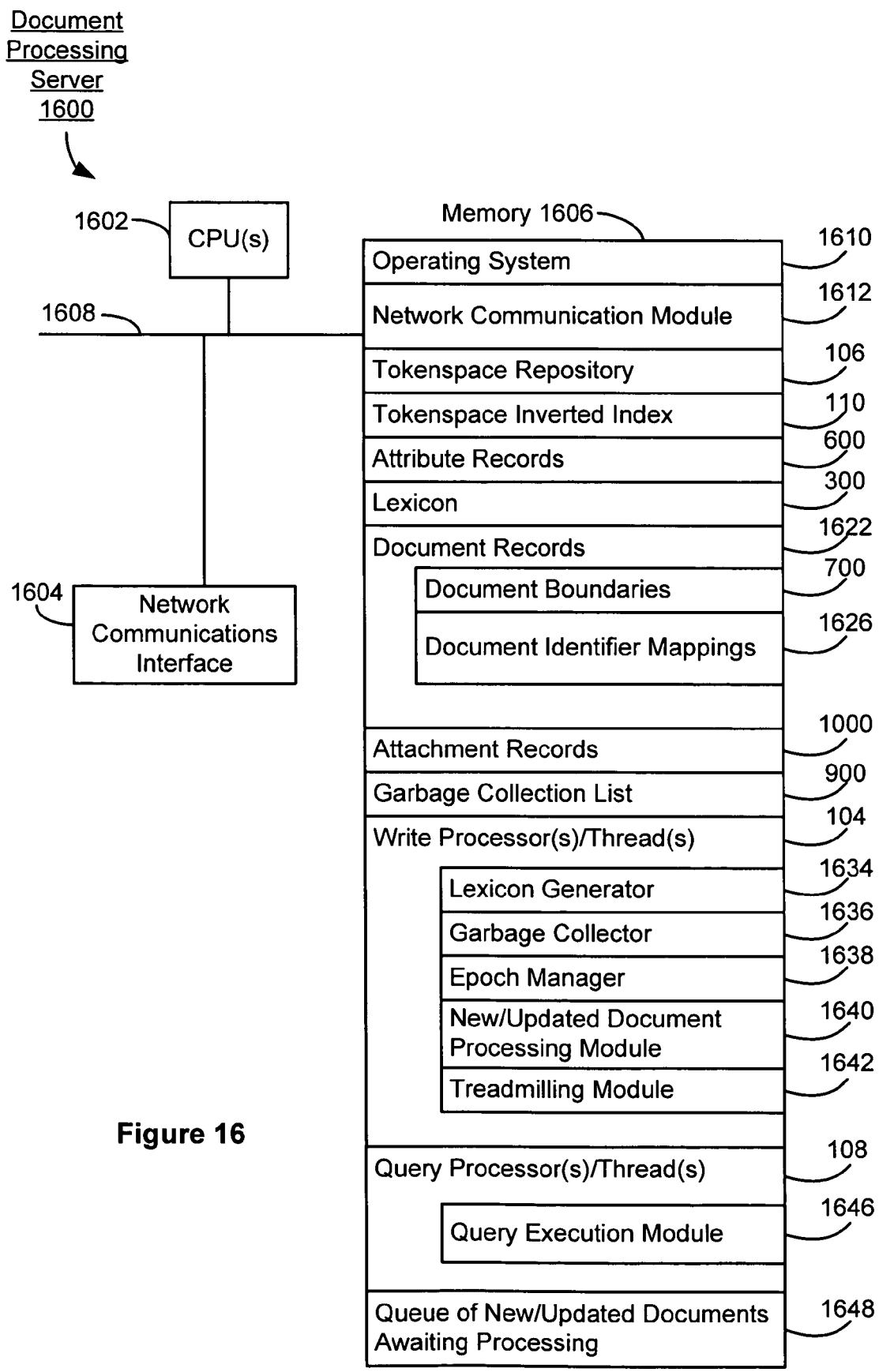
FIG. 16 is a block diagram illustrating a document processing server, in accordance with some embodiments.

FIG. 16 is a block diagram illustrating a document processing server in accordance with some embodiments. The document processing server 1600 typically includes one or more processing units (CPU's) 1602, one or more network or other communications interfaces 1604, memory 1606, and one or more communication buses 1608 for coupling these components. The document processing server 1600 optionally may include a user interface comprising a display device and a keyboard/mouse (not shown). The memory 1606 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The communication buses 1608 may include circuitry (sometimes called a chipset) that interconnects and controls communications between system components. Memory 1606 may optionally include one or more storage devices remotely located from the CPU(s) 1602. In some embodiments, memory 1606 stores the following programs, modules and data structures, or a subset thereof:

- an operating system 1610 that includes procedures for handling various basic system services and for performing hardware dependent tasks;
- a network communication module 1612 that is used for connecting the document processing server 1600 to other computers via the one or more communication network interfaces 1604 (wired or wireless), and one or more communication networks, such as the Internet, other wide area networks, local area networks, metropolitan area networks, and so on;
- a tokenspace repository 106;
- a tokenspace inverted index 110;
- attribute records 600;
- a lexicon 300;
- document records 1622;
- attachment records 1000;
- garbage collection list 900;
- write processor(s) or thread(s) 104;
- query processor(s) or thread(s) 108; and
- a queue 1648 of new or updated documents awaiting processing, for holding new or updated versions of documents that are awaiting processing by the write processor(s) 104.

The document records 1622 include document boundaries 700 and document identifier mappings 1626. In some embodiments, the document identifier mappings 1626 include the global to local document identifier mapping 800 (or 840) and the local to global document identifier mapping 820.

The write processors or thread 104 includes a lexicon generator 1634, for generating the lexicon from a set of documents, a garbage collector 1636 for garbage collecting (recovering) storage space from deleted documents, an epoch manager 1638 for managing the starting and ending of epochs and maintaining counts of running processes and items to be deleted in each epoch, a new/updated document processing module 1640 for adding new or updated documents to the tokenspace repository 106 and updating the tokenspace inverted index 110, and a treadmilling module 1642 for treadmilling data in the tokenspace repository 106 and in other data structures.

The query processors or threads 108 include query execution module 1646 for executing queries in the threads.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1606 may store a subset of the modules and data structures identified above. Furthermore, memory 1606 may store additional modules and data structures not described above.

Although FIG. 16 shows a "document processing server," FIG. 16 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 16 could be implemented on single servers and single items could be implemented by one or more servers. The actual number of servers used to implement a document processing server and how features are allocated among them will vary from one implementation to another.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of processing documents, comprising:
   storing a first version of a document within an accessible range of a repository that stores multiple documents, the repository stored in memory, the accessible range comprising a range of positions in the repository and having first and second ends, wherein documents stored in the accessible range are accessible by a plurality of threads;
   receiving a second version of the document;
   storing the second version of the document in the repository outside of the accessible range;
   modifying the second end of the accessible range of the repository to include the second version previously stored outside of the accessible range of the repository, wherein after the modifying both the first version of the document and second version of the document are accessible by the plurality of threads;
   invalidating but not deleting the first version of the document, wherein
      the invalidated first version of the document continues to remain accessible to those of the executing queries that began execution prior to the invalidating and that utilize the first version of the document,
      while those of the executing queries that begin execution after the invalidating of the first version of the document cannot access the invalidated first version of the document;
   executing queries against the repository in the plurality of threads, including continuing to execute queries without interruption during said operations of receiving the second version of the document, storing the second version of the document in the repository, modifying the second end of the accessible range of the repository, and invalidating the first version of the document;
   deleting the invalidated first version of the document when it is no longer referenced by any active threads; and
   storing a plurality of index records in an index, each record associated with a unique term in the first or second versions of the document, and having an associated accessible range of entries specifying repository locations of the associated term.

2. The method of claim 1, further comprising:
   in conjunction with modifying the accessible range of the repository to include the second version, modifying the accessible range of a plurality of the index records to include entries corresponding to both the first version and second version.

3. The method of claim 1, wherein the executing comprises:
   executing, by each thread, a respective sequence of queries, each query executed using the range of the repository that was accessible while initiating execution of the query without regard to any changes made to the accessible range of the repository during execution of the query.

4. A system for processing documents, comprising:
   one or more processors for executing instructions;
   a repository configured for storing multiple documents within an accessible range of the repository; and
   memory storing one or more modules to be executed by the one or more processors, the modules including instructions:
      to store a first version of a document within an accessible range of the repository, the accessible range comprising a range of positions in the repository and having first and second ends, wherein documents stored in the accessible range are accessible by a plurality of threads;
      to receive a second version of the document;
      to store the second version of the document in the repository outside of the accessible range;
      to modify the second end of the accessible range of the repository to include the second version previously stored outside of the accessible range of the repository, wherein after the modifying both the first version of the document and second version of the document are accessible by the plurality of threads;
      to invalidate but not delete the first version of the document, wherein
         the invalidated first version of the document continues to remain accessible to those of the executing queries that began execution prior to the invalidating and that utilize the first version of the document,
         while those of the executing queries that begin execution after the invalidating of the first version of the document cannot access the invalidated first version of the document;
      to execute queries against the repository in the plurality of threads, including instructions to continuing to execute queries without interruption during said operations of receiving the second version of the document, storing the second version of the document in the repository, modifying the second end of the accessible range of the repository, and invalidating the first version of the document;
      to delete the invalidated first version of the document when it is no longer referenced by any active threads;
      to store a plurality of index records in an index, each record associated with a unique term in the first or second versions of the document, and having an associated accessible range of entries specifying repository locations of the associated term; and
      in conjunction with modifying the accessible range of the repository to include the second version, to modify the accessible range of a plurality of the index records to include entries corresponding to both the first version and second version.

5. The system of claim 4, wherein the modules include instructions:
   to modify, in conjunction with modifying the accessible range of the repository to include the second version, the accessible range of a plurality of the index records to include entries corresponding to both the first version and second version.

6. The system of claim 4, wherein the modules include instructions to execute, by each thread, a respective sequence of queries, each query executed using the range of the repository that was accessible while initiating execution of the query without regard to any changes made to the accessible range of the repository during execution of the query.

7. A computer program product for use in conjunction with a computer system, the computer program product comprising a computer readable storage medium and a computer program mechanism embedded therein, the computer program mechanism comprising instructions for:
   storing a first version of a document within an accessible range of a repository that stores multiple documents, the accessible range comprising a range of positions in the repository and having first and second ends, wherein documents stored in the accessible range are accessible by a plurality of threads;

receiving a second version of the document;

storing the second version of the document in the repository outside of the accessible range;

modifying the second end of the accessible range of the repository to the second version previously stored outside of the accessible range of the repository, wherein after the modifying both the first version of the document and second version of the document are accessible by the plurality of threads;

invalidating but not deleting the first version of the document, wherein the invalidated first version of the document continues to remain accessible to those of the executing queries that began execution prior to the invalidating and that utilize the first version of the document, while those of the executing queries that begin execution after the invalidating of the first version of the document cannot access the invalidated first version of the document;

executing queries against the repository in the plurality of threads, including continuing to execute queries without interruption during said operations of receiving the second version of the document, storing the second version of the document in the repository, modifying the second end of the accessible range of the repository, and invalidating the first version of the document;

deleting the invalidated first version of the document when it is no longer referenced by any active threads; and storing a plurality of index records in an index, each record associated with a unique term in the first or second versions of the document and having an associated accessible range of entries specifying repository locations of the associated term.

8. The computer program product of claim 7, including instructions for:

in conjunction with modifying the accessible range of the repository to include the second version, modifying the accessible range of a plurality of the index records to include entries corresponding to both the first version and second version.

9. The computer program product of claim 8, including instructions for:

executing, by each thread, a respective sequence of queries, each query executed using the range of the repository that was accessible while initiating execution of the query without regard to any changes made to the accessible range of the repository during execution of the query.

10. A system for processing documents, comprising:

one or more processors for executing instructions;

a document repository configured for storing documents within an accessible range of the repository;

means for storing a first version of a document within the accessible range of the repository, the accessible range comprising a range of positions in the repository and having first and second ends, wherein documents stored in the accessible range are accessible by a plurality of threads;

means for receiving the second version of a document;

means for storing the second version of the document in the repository outside of the accessible range;

means for modifying the second end of the accessible range of the repository to include the second version previously stored outside of the accessible range of the repository, wherein after the modifying both the first version of the document and second version of the document are accessible by the plurality of threads;

means for invalidating but not deleting the first version of the document, wherein the invalidated first version of the document continues to remain accessible to those of the executing queries that began execution prior to the invalidating and that utilize the first version of the document, while those of the executing queries that begin execution after the invalidating of the first version of the document cannot access the invalidated first version of the document;

means for executing queries against the repository in the plurality of threads, including continuing to execute queries without interruption during said operations of receiving the second version of the document, storing the second version of the document in the repository, modifying the second end of the accessible range of the repository, and invalidating the first version of the document;

means for deleting the invalidated first version of the document when it is no longer referenced by any active threads; and means for storing a plurality of index records in an index, each record associated with a unique term in the first or second versions of the document, and having an associated accessible range of entries specifying repository locations of the associated term.

11. The system of claim 10, further including means, operative in conjunction with modifying the accessible range of the repository to include the second version, for modifying the accessible range of a plurality of the index records to include entries corresponding to both the first version and second version.

12. The system of claim 10, wherein the means for executing queries against the repository executes each query using the range of the repository that was accessible while initiating execution of the query without regard to any changes made to the accessible range of the repository during execution of the query.

\* \* \* \* \*